US012674033B2

(12) United States Patent
Ishikawa et al.

(10) Patent No.: US 12,674,033 B2
(45) Date of Patent: Jul. 7, 2026

(54) POLYCARBONATE-POLYORGANOSILOXANE COPOLYMER

(71) Applicant: IDEMITSU KOSAN CO., LTD., Tokyo (JP)

(72) Inventors: Yasuhiro Ishikawa, Ichihara (JP); Hajime Watanabe, Ichihara (JP); Aki Yamada, Ichihara (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 979 days.

(21) Appl. No.: 17/789,165

(22) PCT Filed: Dec. 25, 2020

(86) PCT No.: PCT/JP2020/048801

§ 371 (c)(1),
(2) Date: Jun. 24, 2022

(87) PCT Pub. No.: WO2021/132590

PCT Pub. Date: Jul. 1, 2021

(65) Prior Publication Data

US 2023/0116659 A1 Apr. 13, 2023

(30) Foreign Application Priority Data

Dec. 27, 2019 (JP) ................................ 2019-239447

(51) Int. Cl.

| | |
|---|---|
| ***C08G 77/448*** | (2006.01) |
| ***C08G 64/18*** | (2006.01) |
| ***C08G 77/14*** | (2006.01) |
| ***C08G 77/38*** | (2006.01) |
| ***C08L 69/00*** | (2006.01) |
| ***C08L 83/04*** | (2006.01) |
| ***C08L 83/10*** | (2006.01) |

(52) U.S. Cl.

CPC ......... *C08G 77/448* (2013.01); *C08G 64/186* (2013.01); *C08G 77/14* (2013.01); *C08G 77/38* (2013.01); *C08L 83/04* (2013.01); *C08L 83/10* (2013.01); *C08L 69/00* (2013.01)

(58) Field of Classification Search

CPC .... C08G 64/186; C08G 77/14; C08G 77/448; C08G 64/18; C08G 77/38; C08L 83/10; C08L 83/00; C08L 83/04; C08L 69/00

See application file for complete search history.

(56) References Cited

U.S. PATENT DOCUMENTS

| | | | |
|---|---|---|---|
| 2003/0065122 | A1 | 4/2003 | Davis |
| 2008/0210129 | A1 | 9/2008 | Nienstedt et al. |
| 2012/0283393 | A1 | 11/2012 | Ishikawa |
| 2014/0256888 | A1 | 9/2014 | Ishikawa et al. |
| 2016/0046797 | A1 | 2/2016 | Abe et al. |
| 2020/0407499 | A1 | 12/2020 | Ideta et al. |

FOREIGN PATENT DOCUMENTS

| | | | |
|---|---|---|---|
| CN | 102652149 | A | 8/2012 |
| CN | 105121515 | A | 12/2015 |
| EP | 2 980 122 | A1 | 2/2016 |
| JP | H05-200761 | A | 8/1993 |
| JP | H05-202181 | A | 8/1993 |
| JP | H05-202182 | A | 8/1993 |
| JP | H08-73741 | A | 3/1996 |
| JP | 2662310 | B2 | 10/1997 |
| JP | H10-17670 | A | 1/1998 |
| JP | H11-130865 | A | 5/1999 |
| JP | 2000-026737 | A | 1/2000 |
| JP | 2005-520922 | A | 7/2005 |
| JP | 2010-248413 | A | 11/2010 |
| JP | 2011-046911 | A | 3/2011 |
| JP | 5919294 | B2 | 5/2016 |
| JP | 2019-044129 | A | 3/2019 |
| WO | WO-02/04545 | A1 | 1/2002 |
| WO | WO-2011/007128 | A1 | 1/2011 |
| WO | WO-2011/071128 | A1 | 6/2011 |
| WO | WO-2014/157681 | A1 | 10/2014 |
| WO | WO-2019/131973 | A1 | 7/2019 |

OTHER PUBLICATIONS

Office Action issued in corresponding Japanese Patent Application No. 2021-567686 dated Jul. 2, 2024 (5 pages).
Office Action issued in connection with Taiwan Appl. No. 109146316 dated Jul. 29, 2024.
European Extended Search Report issued in corresponding European Patent Application No. 20905880.9 dated Oct. 12, 2023 (7 pages).
Office Action issued in corresponding Chinese Patent Application No. 202080090284.1 dated Sep. 6, 2023 (20 pages).
International Searching Authority, "International Search Report," issued in connection with International Patent Application No. PCT/JP2020/048801, dated Mar. 23, 2021.
International Searching Authority, "Written Opinion," issued in connection with International Patent Application No. PCT/JP2020/048801, dated Mar. 23, 2021.
Office Action issued in corresponding Taiwanese Patent Application No. 109146316 dated Jan. 21, 2025.
Office Action issued in corresponding Chinese Patent Application No. 202080090284.1 dated Jun. 29, 2024 (17 pages).
Office Action issued in corresponding European Patent Application No. 20905880.9 dated Jul. 4, 2025.
Office Action issued in corresponding Indian Patent Application No. 2022-47036445 dated Aug. 22, 2025.

*Primary Examiner* — Marc S Zimmer
*Assistant Examiner* — Surbhi M Du
(74) *Attorney, Agent, or Firm* — Foley & Lardner LLP

(57) ABSTRACT

A polycarbonate-polyorganosiloxane copolymer comprises a polycarbonate block (A-1) formed of a repeating unit with a specific structure and a polyorganosiloxane block (A-2) containing a repeating unit with a specific structure. A difference between the haze value (haze A) after retention for 3 minutes and the haze value (haze B) after retention for 20 minutes, of the polycarbonate-polyorganosiloxane copolymer or a resin composition thereof at 300° C. or 340° C., Δhaze, is less than 0.4.

16 Claims, No Drawings

POLYCARBONATE-POLYORGANOSILOXANE COPOLYMER

CROSS-REFERENCE TO RELATED APPLICATIONS

The present application claims priority under 37 U.S.C. § 371 to International Patent Application No. PCT/JP2020/048801, filed Dec. 25, 2020, which claims priority to and the benefit of Japanese Patent Application No. 2019-239447, filed on Dec. 27, 2019. The contents of these applications are hereby incorporated by reference in their entireties.

TECHNICAL FIELD

The present invention relates to a polycarbonate-polyorganosiloxane copolymer. More specifically, the present invention relates to a polycarbonate-polyorganosiloxane copolymer that provides a molded article having excellent thermal stability and excellent transparency even when molded at high temperature.

BACKGROUND ART

A Polycarbonate resin produced from bisphenol A or the like (hereinafter, also abbreviated as PC resin) is known as a resin having extremely high impact resistance and excellent heat resistance among engineering plastics. On the other hand, attempts have been made to produce a polycarbonate-polyorganosiloxane copolymer having further enhanced impact resistance and heat resistance from polyorganosiloxane as a copolymerization monomer together with divalent phenol such as bisphenol A.

A polycarbonate-polyorganosiloxane copolymer (hereinafter, also abbreviated as PC-POS copolymer) is known as a polycarbonate resin having excellent flame retardancy and impact resistance (for example, Patent Literature 1). The PC-POS copolymer is expected to be widely used in various fields such as electrical and electronic equipment fields and automobile fields, due to excellent properties such as high impact resistance, chemical resistance, and flame retardancy.

Patent Literature 2 discloses a polycarbonate-polyorganosiloxane copolymer having improved transparency, and evaluates the total light transmittance, haze value, etc.

Patent Literature 3 to 5 disclose molded articles having improved lubricating properties, abrasion resistance, etc., produced from a PC-POS copolymer.

Patent Literature 6 describes a method for producing a PC-POS copolymer, which has a specific step.

CITATION LIST

Patent Literature

PTL1: Japanese Patent No. 2662310
PTL2: JP 2011-046911 A
PTL3: JP 05-202181 A
PTL4: JP 05-202182 A
PTL5: JP 05-200761 A
PTL6: Japanese Patent No. 5919294

SUMMARY OF INVENTION

Technical Problem

In recent years, materials having the characteristics of PC-POS copolymers have been desired for many applications, and molding into various molded article shapes has been required. Therefore, the temperature during the molding process tends to be increased for ensuring the fluidity of the resin. However, PC-POS copolymers have a problem that the transparency tends to be reduced than general polycarbonate in molding at high temperature.

Although Patent Literature 2 reports that the total light transmittance (88% or more) is improved by a PC-POS copolymer having a specific average domain size and a normalized dispersion, such a total light transmittance has been conventionally achieved. Although Patent Literature 3 to 5 show improvement in mechanical strength of a PC-POS copolymer, improvement in thermal stability such as transparency in molding at high temperature has not been considered. Although Patent Literature 6 discloses a method for producing a PC-POS copolymer having excellent impact resistance and transparency, the thermal stability such as transparency in molding at high temperature is still insufficient.

In view of the above, an object of the present invention is to provide a polycarbonate-polyorganosiloxane copolymer having excellent mechanical properties such as impact resistance and excellent transparency even after molding at high temperature.

Solution to Problem

As a result of diligent research, the present inventors have found that a polycarbonate-polyorganosiloxane copolymer having a specific polyorganosiloxane block structure and specific haze conditions has high transparency. In other words, the present invention relates to the following.

[1] A polycarbonate-polyorganosiloxane copolymer comprising a polycarbonate block (A-1) formed of a repeating unit represented by the following general formula (I) and a polyorganosiloxane block (A-2) containing a repeating unit represented by the following general formula (II), wherein a difference between a haze value (haze A) after retention for 3 minutes and a haze value (haze B) after retention for 20 minutes, of the polycarbonate-polyorganosiloxane copolymer at 300° C. or 340° C., Δhaze, is less than 0.4:

[Formula 1]

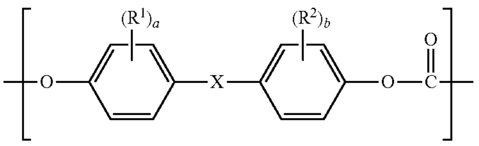
(I)

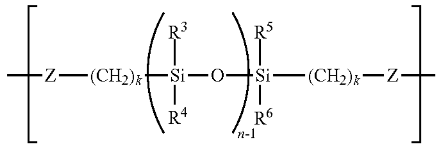
(II)

wherein $R^1$ and $R^2$ each independently represent a halogen atom, an alkyl group having 1 to 6 carbon atoms, or an alkoxy group having 1 to 6 carbon atoms; X represents a single bond, an alkylene group having 1 to 8 carbon atoms, an alkylidene group having 2 to 8 carbon atoms, a cycloalkylene group having 5 to 15 carbon atoms, an arylene group having 6 to 12 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, $—SO_2—$, —O— or —CO—; a and b each independently represent an integer of 0 to 4; $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms; n represents the average chain length of polyorganosiloxane, and n−1 represents the number of repetitions of the polyorganosiloxane unit and is an integer of 1 or more; Z represents a divalent hydrocarbon group, and at least one of the hydrogen atoms contained in the divalent hydrocarbon group is optionally replaced by a halogen atom or a monovalent hydrocarbon group having 1 to 20 carbon atoms; at least one of the carbon atoms in the divalent hydrocarbon group or the monovalent hydrocarbon group is optionally replaced by an oxygen atom, a nitrogen atom or a sulfur atom; and k represents an integer of 2 or 3.

[2] The polycarbonate-polyorganosiloxane copolymer according to the item [1], wherein the polycarbonate-polyorganosiloxane copolymer has a platinum content of 0.05 mass ppb or more and less than 0.5 mass ppm.

[3] The polycarbonate-polyorganosiloxane copolymer according to the item [1] or [2], wherein Z in the formula (II) is represented by the following general formula (II-a):

[Formula 2]

(II-a)

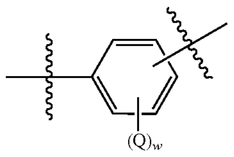

wherein Q represents a halogen atom or a monovalent hydrocarbon group having 1 to 20 carbon atoms, and at least one of the hydrogen atoms contained in the monovalent hydrocarbon group is optionally replaced by a halogen atom; at least one of the carbon atoms of the monovalent hydrocarbon group is optionally replaced by an oxygen atom, a nitrogen atom or a sulfur atom; w is an integer of 0 to 4, and a wavy line represents a binding site.

[4] The polycarbonate-polyorganosiloxane copolymer according to any one of the items [1] to [3], wherein the polyorganosiloxane block (A-2) has an average chain length n of 10 or more and 300 or less.

[5] The polycarbonate-polyorganosiloxane copolymer according to any one of the items [1] to [4], comprising a polycarbonate-polyorganosiloxane copolymer represented by the following general formula (f) and a compound represented by the following general formula (g), wherein a ratio [total number of hydroxy group in formula (f) and formula (g)]/[total number of group represented by formula (v-ii) and hydroxy group in formula (f) and formula (g)] is less than 0.01:

[Formula 3]

$$—(CH_2)_k—Z— \quad \text{(v-ii)}$$

wherein Z is as described above; and k is 2 or 3;

[Formula 4]

(f)

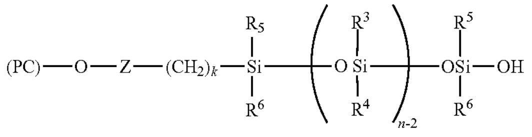

wherein $R^3$ to $R^6$, n and k are as described above; and (PC) represents a bond to a polycarbonate block;

[Formula 5]

(g)

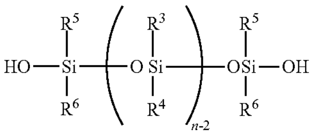

wherein $R^3$ to $R^6$ and n are as described above.

[6] A polycarbonate-polyorganosiloxane copolymer produced by copolymerizing a carbinol-modified polyorganosiloxane with a divalent phenol and a carbonate precursor, the carbinol-modified polyorganosiloxane being obtained through a hydrosilylation reaction of an organohydrogensiloxane represented by the following general formula (2), a compound represented by the following general formula (3), and a platinum catalyst that are continuously supplied to a reactor and passed through the reactor; or produced by copolymerizing the carbinol-modified polyorganosiloxane with an oligomer having a repeating unit represented by the following general formula (I):

[Formula 6]

(2)

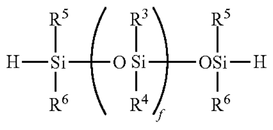

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms; a plurality of $R^3$ to $R^6$ may be identical to or different from each other; and f is an integer of 0 to 500;

[Formula 7]

$$R^{22}—Z—OH \quad (3)$$

wherein $R^{22}$ represents a vinyl group or an allyl group, Z represents a divalent hydrocarbon group, and at least one of the hydrogen atoms contained in the divalent hydrocarbon group is optionally replaced by a halogen atom or a monovalent hydrocarbon group having 1 to 20 carbon atoms; and at least one of the carbon atoms in each of the divalent hydrocarbon group and the monovalent hydrocarbon group is optionally replaced by an oxygen atom, a nitrogen atom or a sulfur atom;

[Formula 8]

(I)

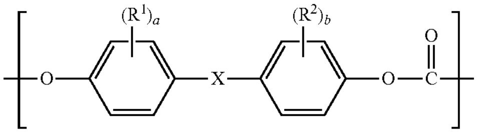

wherein $R^1$ and $R^2$ each independently represent a halogen atom, an alkyl group having 1 to 6 carbon atoms, or an alkoxy group having 1 to 6 carbon atoms; X represents a single bond, an alkylene group having 1 to 8 carbon atoms, an alkylidene group having 2 to 8 carbon atoms, a cycloalkylene group having 5 to 15 carbon atoms, an arylene group having 6 to 12 carbon atoms, and a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, $—SO_2—$, —O— or —CO—; and a and b each independently represent an integer of 0 to 4.

[7] The polycarbonate-polyorganosiloxane copolymer according to the item [6], wherein the platinum catalyst is used in an amount of 0.005 mass ppm or more and less than 1.0 mass ppm in terms of platinum metal relative to the total amount of the organohydrogensiloxane represented by the general formula (2), the compound represented by the general formula (3), and the platinum catalyst.

[8] The polycarbonate-polyorganosiloxane copolymer according to the item [6] or [7], wherein the platinum catalyst is used in an amount of 0.005 mass ppm or more and 0.2 mass ppm or less in terms of platinum metal relative to the total amount of the organohydrogensiloxane represented by the general formula (2), the compound represented by the general formula (3), and the platinum catalyst.

[9] The polycarbonate-polyorganosiloxane copolymer according to any one of the items [6] to [8], wherein the compound represented by the general formula (3) is a compound represented by the following general formula (33):

[Formula 9]

(33)

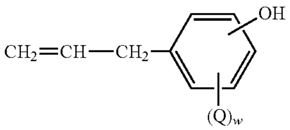

wherein Q represents a halogen atom or a monovalent hydrocarbon group having 1 to 20 carbon atoms, and at least one of the hydrogen atoms contained in the monovalent hydrocarbon group is optionally replaced by a halogen atom; at least one of the carbon atoms of the monovalent hydrocarbon group is optionally replaced by an oxygen atom, a nitrogen atom or a sulfur atom; and w is an integer of 0 to 4.

[10] The polycarbonate-polyorganosiloxane copolymer according to any one of the items [6] to [9], wherein, as the carbinol-modified polyorganosiloxane, a carbinol-modified polyorganosiloxane represented by the following general formula (222), with $R^a$ in formula (222) having a ratio [number of group represented by formula (vi)]/[total number of group represented by formula (v) and group represented by formula (vi)] of less than 0.01, is used:

[Formula 10]

(222)

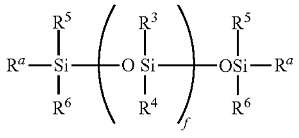

wherein $R^3$ to $R^6$ and f are as described above, and each $R^a$ is independently a group represented by the following general formula (v) or (vi):

[Formula 11]

$$—(CH_2)_k—Z—OH \quad (v)$$

wherein Z is as described above, and k is 2 or 3;

[Formula 12]

$$—O—Z—R^{33} \quad (vi)$$

wherein Z is as described above; $R^{33}$ represents a vinyl group, an allyl group, or a terminal group having $—(CH_2)_k—SiR^5R^6O—$ derived from a reaction between Si—H of the following general formula (2) and a vinyl group or an allyl group; and k is 2 or 3:

[Formula 13]

(2)

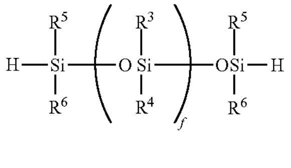

wherein $R^3$ to $R^6$ and f are as described above.

[11] The polycarbonate-polyorganosiloxane copolymer according to the item [10], comprising a polycarbonate-polyorganosiloxane copolymer having a polyorganosiloxane unit represented by the following general formula (222-i), a polycarbonate-polyorganosiloxane copolymer represented by the following general formula (b), and a compound represented by the following general formula (c), wherein a ratio [number of group represented by {—O—Z—$R^{33}$} in formula (b) and formula (c)]/[total number of group represented by formula (v-i) and group represented by {—O—Z—$R^{33}$} in formula (b) and formula (c)] is less than 0.01:

[Formula 14]

(222-i)

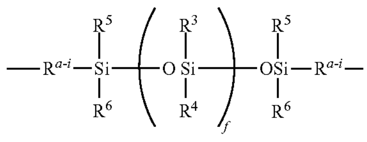

wherein $R^3$ to $R^6$ and f are as described above, and each $R^{a-1}$ is independently a group represented by the following general formula (v-i):

[Formula 15]

(v-i)

$$—(CH_2)_k—Z—O—$$

wherein Z is as described above; an oxygen atom in formula (v-i) is bonded to a polycarbonate unit; and k is 2 or 3,

[Formula 16]

(b)

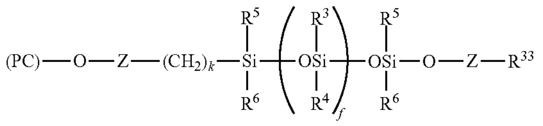

wherein $R^3$ to $R^6$, Z, $R^{33}$, f, and k are as described above, and (PC) represents a bond to a polycarbonate block,

[Formula 17]

(c)

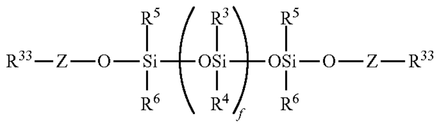

wherein $R^3$ to $R^6$, Z, $R^{33}$, and f are as described above.

[12] The polycarbonate-polyorganosiloxane copolymer according to any one of the items [6] to [9], wherein, as the carbinol-modified polyorganosiloxane, a carbinol-modified polyorganosiloxane represented by the following general formula (223), with $R^b$ in formula (223) having a ratio [number of hydroxy group]/[total number of hydroxy group and group represented by formula (v)] of less than 0.01, is used:

[Formula 18]

(223)

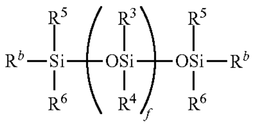

wherein $R^3$ to $R^6$ and f are as described above, and each $R^b$ is independently a hydroxy group or a group represented by the following general formula (v):

[Formula 19]

(v)

$$—(CH_2)_k—Z—OH$$

wherein Z is as described above, and k is 2 or 3.

[13] The polycarbonate-polyorganosiloxane copolymer according to the item [12], comprising a polycarbonate-polyorganosiloxane copolymer having a polyorganosiloxane unit represented by the following general formula (223-i), a polycarbonate-polyorganosiloxane copolymer represented by the following general formula (d), and a compound represented by the following general formula (e), wherein a ratio [total number of hydroxy group in formula (d) and formula (e)]/[total number of group represented by formula (v-i) and hydroxy group in formula (d) and formula (e)] is less than 0.01:

[Formula 20]

(223-i)

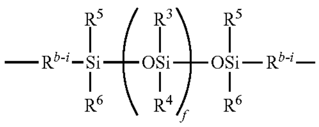

wherein $R^3$ to $R^6$ and f are as described above, and each $R^{b-i}$ is independently a group represented by the following general formula (v-i):

[Formula 21]

(v-i)

$$—(CH_2)_k—Z—O—$$

wherein Z is as described above; an oxygen atom in the formula (v-i) is bonded to a polycarbonate unit; and k is 2 or 3,

[Formula 22]

(d)

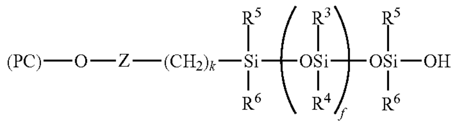

wherein $R^3$ to $R^6$, f and k are as described above, and (PC) represents a bond to a polycarbonate block,

[Formula 23]

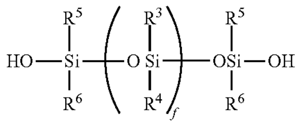

(e)

wherein $R^3$ to $R^6$ and f are as described above.

[14] A polycarbonate-based resin composition comprising the polycarbonate-polyorganosiloxane copolymer according to any one of the items [1] to [13].

[15] A molded article comprising the polycarbonate-based resin composition according to the item [14].

The present invention also relates to the following.

[101] A method for producing a polycarbonate-polyorganosiloxane copolymer comprising:

a step (X1) of obtaining a carbinol-modified polyorganosiloxane through a hydrosilylation reaction of an organohydrogensiloxane represented by the following general formula (2), a compound represented by the following general formula (3), and a platinum catalyst that are continuously supplied to a reactor and passed through the reactor, and a step (X2) of copolymerizing the carbinol-modified polyorganosiloxane obtained in the step (X1) with a divalent phenol and a carbonate precursor, or with an oligomer having a repeating unit represented by the following general formula (I):

[Formula 24]

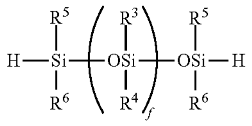

(2)

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms; a plurality of $R^3$ to $R^6$ may be identical to or different from each other; and f is an integer of 0 to 500;

[Formula 25]

$$R^{22}—Z—OH \quad (3)$$

wherein $R^{22}$ represents a vinyl group or an allyl group, Z represents a divalent hydrocarbon group, and at least one of the hydrogen atoms contained in the divalent hydrocarbon group is optionally replaced by a halogen atom or a monovalent hydrocarbon group having 1 to 20 carbon atoms; and at least one of the carbon atoms in each of the divalent hydrocarbon group and the monovalent hydrocarbon group is optionally replaced by an oxygen atom, a nitrogen atom or a sulfur atom;

[Formula 26]

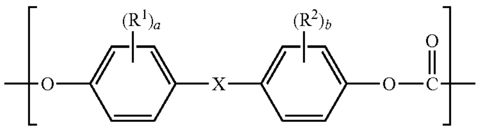

(I)

wherein $R^1$ and $R^2$ each independently represent a halogen atom, an alkyl group having 1 to 6 carbon atoms, or an alkoxy group having 1 to 6 carbon atoms; X represents a single bond, an alkylene group having 1 to 8 carbon atoms, an alkylidene group having 2 to 8 carbon atoms, a cycloalkylene group having 5 to 15 carbon atoms, an arylene group having 6 to 12 carbon atoms, and a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, $—SO_2—$, —O— or —CO—; and a and b each independently represent an integer of 0 to 4.

[102] The method for producing a polycarbonate-polyorganosiloxane copolymer according to the item [101], wherein the platinum catalyst is used in an amount of 0.005 mass ppm or more and less than 1.0 mass ppm in terms of platinum metal relative to the total amount of the organohydrogensiloxane represented by the general formula (2), the compound represented by the general formula (3), and the platinum catalyst in the step (X1).

[103] The method for producing a polycarbonate-polyorganosiloxane copolymer according to the item [101] or [102], wherein the platinum catalyst is used in an amount of 0.005 mass ppm or more and 0.2 mass ppm or less in terms of platinum metal relative to the total amount of the organohydrogensiloxane represented by the general formula (2), the compound represented by the general formula (3), and the platinum catalyst in the step (X1).

The method for producing a polycarbonate-polyorganosiloxane copolymer according to any one of the items [101] to [103], wherein the compound represented by the general formula (3) is a compound represented by the following general formula (33):

[Formula 27]

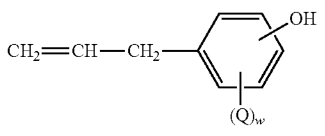

(33)

wherein Q represents a halogen atom or a monovalent hydrocarbon group having 1 to 20 carbon atoms, and at least one of the hydrogen atoms contained in the monovalent hydrocarbon group is optionally replaced by a halogen atom; at least one of the carbon atoms of the monovalent hydrocarbon group is optionally replaced by an oxygen atom, a nitrogen atom or a sulfur atom; and w is an integer of 0 to 4.

Advantageous Effects of Invention

According to the present invention, a polycarbonate-polyorganosiloxane copolymer having excellent mechanical properties derived from a polyorganosiloxane block, with excellent transparency maintained even after molding at high temperature, i.e., having high thermal stability, can be produced.

DESCRIPTION OF EMBODIMENT

The polycarbonate-polyorganosiloxane copolymer of the present invention will be described in detail as follows. In the present specification, preferred provisions may be optionally adopted, and it can be said that a combination of preferred ones is more preferred. In the present specification, a description "XX to YY" means "XX or more and YY or less".

The polycarbonate-polyorganosiloxane copolymer of the present invention comprises a polycarbonate block (A-1) formed of a repeating unit represented by the following general formula (I) and a polyorganosiloxane block (A-2) containing a repeating unit represented by the following general formula (II), wherein a difference between the haze value (haze A) after retention for 3 minutes and the haze value (haze B) after retention for 20 minutes, of the polycarbonate-polyorganosiloxane copolymer or a resin composition thereof at 300° C. or 340° C., Δhaze, is less than 0.4:

[Formula 28]

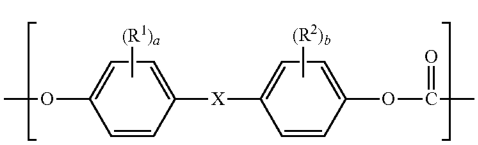
(I)

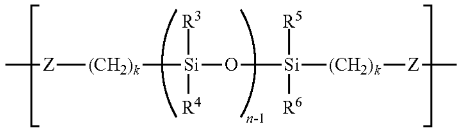
(II)

wherein $R^1$ and $R^2$ each independently represent a halogen atom, an alkyl group having 1 to 6 carbon atoms, or an alkoxy group having 1 to 6 carbon atoms; X represents a single bond, an alkylene group having 1 to 8 carbon atoms, an alkylidene group having 2 to 8 carbon atoms, a cycloalkylene group having 5 to 15 carbon atoms, an arylene group having 6 to 12 carbon atoms, and a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —$SO_2$—, —O— or —CO—; a and b each independently represent an integer of 0 to 4; $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms; n represents the average chain length of polyorganosiloxane, and $n-1$ represents the number of repetitions of the polyorganosiloxane unit and is an integer of 1 or more; Z represents a divalent hydrocarbon group, and at least one of the hydrogen atoms contained in the divalent hydrocarbon group is optionally replaced by a halogen atom or a monovalent hydrocarbon group having 1 to 20 carbon atoms; at least one of the carbon atoms in the divalent hydrocarbon group or the monovalent hydrocarbon group is optionally replaced by an oxygen atom, a nitrogen atom or a sulfur atom; and k represents an integer of 2 or 3.

<Polycarbonate-Polyorganosiloxane Copolymer>

The polycarbonate-polyorganosiloxane copolymer of the present invention comprises a polycarbonate block (A-1) formed of a repeating unit represented by the general formula (I) and a polyorganosiloxane block (A-2) containing a repeating unit represented by the general formula (II).

The polycarbonate block (A-1) represented by the general formula (I) will be described in detail. In the general formula (I), examples of the halogen atoms independently represented by $R^1$ and $R^2$ each include a fluorine atom, a chlorine atom, a bromine atom, and a iodine atom.

Examples of the alkyl groups independently represented by $R^1$ and $R^2$ each include a methyl group, an ethyl group, a n-propyl group, an isopropyl group, and various butyl groups ("various" means that a linear chain and all branched chains are included, and the same applies hereinafter), various pentyl groups, and various hexyl groups. Examples of the alkoxy group independently represented by $R^1$ and $R^2$ include ones of which alkyl group moiety is the alkyl group.

Examples of the alkylene group represented by X include a methylene group, an ethylene group, a trimethylene group, a tetramethylene group, a hexamethylene group, and an alkylene group having 1 to 5 carbon atoms is preferred. Examples of the alkylidene group represented by X include an ethylidene group and an isopropylidene group. Examples of the cycloalkylene group represented by X include a cyclopentanediyl group, a cyclohexanediyl group, a cyclooctanediyl group, and a cycloalkylene group having 5 to 10 carbon atoms is preferred. Examples of the arylene group represented by X include a phenylene group, a naphthylene group, and a biphenylene group. Examples of the cycloalkylidene group represented by X include a cyclohexylidene group, a 3,5,5-trimethylcyclohexylidene group, and a 2-adamantylidene group. A cycloalkylidene group having 5 to 10 carbon atoms is preferred, and a cycloalkylidene group having 5 to 8 carbon atoms is more preferred. Examples of the aryl moiety of the arylalkylene group represented by X include an aryl group having 6 to 14 ring-forming carbon atoms such as a phenyl group, a naphthyl group, a biphenyl group and an anthryl group. Examples of the aryl moiety of the arylalkylidene group represented by X include an aryl group having 6 to 14 ring-forming carbon atoms such as a phenyl group, a naphthyl group, a biphenyl group and an anthryl group.

The symbols a and b each independently represent an integer of 0 to 4, preferably 0 to 2, more preferably 0 or 1. Among them, those in which a and b are 0, and X is a single bond or an alkylene group having 1 to 8 carbon atoms, or those in which a and b are 0 and X is an alkylidene group, particularly an isopropylidene group are preferred.

Examples of the halogen atom independently represented by $R^3$ to $R^6$ each in the general formula (II) include a fluorine atom, a chlorine atom, a bromine atom, and a iodine atom. Examples of the alkyl group independently represented by $R^3$ to $R^6$ each include a methyl group, an ethyl group, a n-propyl group, an isopropyl group, various butyl groups, various pentyl groups, and various hexyl groups. Examples of the alkoxy group independently represented by $R^3$ to $R^6$ each include ones of which alkyl group moiety is the alkyl group. Examples of the aryl group independently represented by $R^3$ to $R^6$ each include a phenyl group and a naphthyl group.

Each of $R^3$ to $R^6$ is preferably a hydrogen atom, an alkyl group having 1 to 6 carbon atoms, an alkoxy group having 1 to 6 carbon atoms, or an aryl group having 6 to 12 carbon atoms, and more preferably a methyl group.

Z represents a divalent hydrocarbon group. The number of carbon atoms of the divalent hydrocarbon group is not particularly limited, preferably 1 to 20, and more preferably 1 to 10.

The divalent hydrocarbon group may be in a straight chain, branched chain or cyclic form, and specific examples thereof include a straight chain, branched chain or cyclic alkylene group such as a methylene, ethylene, trimethylene, propylene, tetramethylene, pentamethylene, hexamethylene, cyclohexylene, and octamethylene group; an arylene group such as an o-phenylene, m-phenylene, p-phenylene, methylphenylene, ethylphenylene, methoxyphenylene, and naphthylene group, and groups obtained by replacing some of or all of the hydrogen atoms of these groups by halogen atoms or monovalent hydrocarbon groups having 1 to 20 carbon atoms. Some of the carbon atoms of these divalent hydrocarbon groups and monovalent hydrocarbon groups are optionally replaced by an oxygen atom, a nitrogen atom or a sulfur atom. The monovalent hydrocarbon group having 1 to 20 carbon atoms or having 1 to 10 carbon atoms may be in a straight chain, branched chain or cyclic form, and specific examples thereof include a straight chain and branched chain alkyl group such as a methyl, ethyl, propyl, isopropyl, butyl, isobutyl, tert-butyl, n-pentyl, neopentyl, n-hexyl, and n-octyl group; a cycloalkyl group such as a cyclopentyl, cyclohexyl, and cyclooctyl group; an aryl group such as a phenyl, tolyl, xylyl, and naphthyl group; an aralkyl group such as a benzyl, phenylethyl, and phenylpropyl group; and groups obtained by replacing some of or all of the hydrogen atoms of these groups by halogen atoms.

Examples of the halogen atom include a fluorine atom, a chlorine atom, a bromine atom, and a iodine atom.

In the case where some of the carbon atoms of the divalent hydrocarbon group and the monovalent hydrocarbon group are replaced by oxygen atoms, nitrogen atoms or sulfur atoms, for example, $-CH_2-$ is replaced by $-O-$, $-NH-$ or $-S-$.

The symbol k represents 2 or 3, preferably 3.

Among these, Z is preferably a phenylene group that is optionally substituted with Q represented by the following general formula (II-a).

[Formula 29]

(II-a)

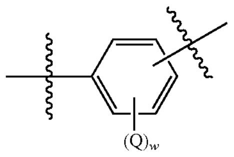

wherein w is an integer of 0 to 4, and the wavy line represents a binding site.

Q represents a halogen atom or a monovalent hydrocarbon group having 1 to 20 carbon atoms, and some of the carbon atoms are optionally replaced by an oxygen atom, a nitrogen atom or a sulfur atom. Specific examples of the group obtained by replacing some of the carbon atoms of the monovalent hydrocarbon group by an oxygen atom include an alkoxy group having 1 to 5 carbon atoms such as a methoxy, ethoxy, isopropoxy, n-butoxy, and tert-butoxy group.

As Q, an alkyl group having 1 to 5 carbon atoms and an alkoxy group having 1 to 5 carbon atoms are preferred, and a methyl group and a methoxy group are more preferred.

The symbol w is an integer of 0 to 4, preferably 0 or 1, more preferably 0.

More specifically, as Z in the formula (II), those represented by the following formulas are preferred.

[Formula 30]

(Z-1)

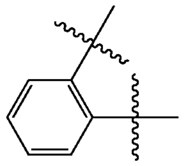

(Z-2)

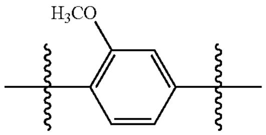

(Z-3)

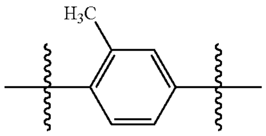

(Z-4)

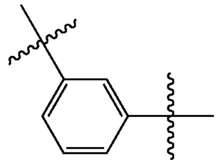

(Z-5)

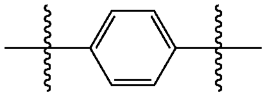

(Z-6)

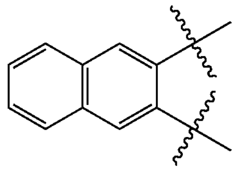

(Z-7)

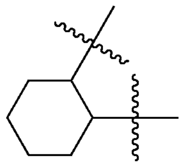

(Z-8)

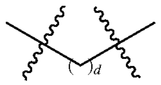

(Z-9)

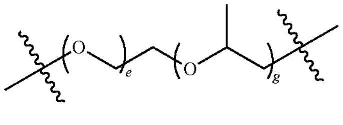

wherein the wavy line represents a binding site. The symbols d, e and g each independently represent an integer of 0 to 50, preferably 0 to 10.

In particular, a group represented by the formula (Z-1), a group represented by the formula (Z-2), or a group represented by the formula (Z-8), wherein d=6, or a group represented by the formula (Z-9), wherein e=1 and g=0, is more preferred.

The polycarbonate-polyorganosiloxane copolymer of the present invention will be described in more detail from another aspect.

The polycarbonate-polyorganosiloxane copolymer of the present invention is produced by copolymerizing a carbinol-modified polyorganosiloxane with a divalent phenol and a carbonate precursor, the carbinol-modified polyorganosiloxane being obtained through a hydrosilylation reaction of an organohydrogensiloxane represented by the following general formula (2), a compound represented by the following general formula (3), and a platinum catalyst that are continuously supplied to a reactor and passed through the reactor; or produced by copolymerizing the carbinol-modified polyorganosiloxane with an oligomer having a repeating unit represented by the following general formula (I). Alternatively, the polycarbonate-polyorganosiloxane copolymer of the present invention may be produced by copolymerizing the carbinol-modified polyorganosiloxane refined by a known method on an as needed basis, with a divalent phenol and a carbonate precursor; or produced by copolymerizing the refined carbinol-modified polyorganosiloxane with an oligomer having a repeating unit represented by the following general formula (I):

[Formula 31]

(2)

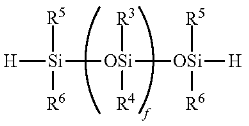

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms; a plurality of $R^3$ to $R^6$ may be identical to or different from each other; and f is an integer from 0 to 500;

[Formula 32]

(3)

$$R^{22}—Z—OH$$

wherein $R^{22}$ represents a vinyl group or an allyl group, Z represents a divalent hydrocarbon group, and at least one of the hydrogen atoms contained in the divalent hydrocarbon group is optionally replaced by a halogen atom or a monovalent hydrocarbon group having 1 to 20 carbon atoms; and at least one of the carbon atoms in each of the divalent hydrocarbon group and the monovalent hydrocarbon group is optionally replaced by an oxygen atom, a nitrogen atom or a sulfur atom;

[Formula 33]

(I)

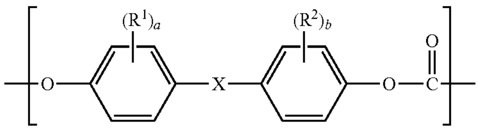

wherein $R^1$ and $R^2$ each independently represent a halogen atom, an alkyl group having 1 to 6 carbon atoms, or an alkoxy group having 1 to 6 carbon atoms; X represents a single bond, an alkylene group having 1 to 8 carbon atoms, an alkylidene group having 2 to 8 carbon atoms, a cycloalkylene group having 5 to 15 carbon atoms, an arylene group having 6 to 12 carbon atoms, and a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —$SO_2$—, —O— or —CO—; and a and b each independently represent an integer of 0 to 4.

The refining will be described later.

Preferred examples of $R^3$ to $R^6$ are as described above, and a combination of preferred ones is also preferred. The symbol f is an integer of 0 or more and 500 or less, more preferably 0 or more and 300 or less, and still more preferably 30 or more and 200 or less.

In another preferred aspect, f is an integer of 8 or more and 298 or less, more preferably 28 or more, still more preferably 33 or more, furthermore preferably 38 or more, more preferably 198 or less, still more preferably 148 or less, furthermore preferably 98 or less, and particularly preferably 93 or less. In the case where f is 500 or less, the molecular weight of the resulting carbinol-modified polyorganosiloxane is in a preferred range from the viewpoint of the transparency and mechanical properties of the copolymer.

$R^{22}$ in the formula (3) represents a vinyl group or an allyl group, and an allyl group is more preferred.

Examples of Z are as described above, and preferred examples and preferred combinations are also as described above.

As the compound represented by the formula (3), the compound represented by the following general formula (33) is more preferred:

[Formula 34]

(33)

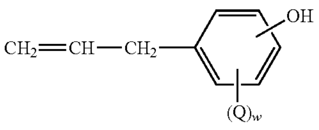

wherein Q represents a halogen atom or a monovalent hydrocarbon group having 1 to 20 carbon atoms, and at least one of the hydrogen atoms contained in the monovalent hydrocarbon group is optionally replaced by a halogen atom; at least one of the carbon atoms of the monovalent hydrocarbon group is optionally replaced by an oxygen atom, a nitrogen atom or a sulfur atom; and w is an integer of 0 to 4.

The platinum catalyst is a catalyst for promoting hydrosilylation, and specific examples thereof include platinum black, platinic chloride, chloroplatinic acid, a reaction product of chloroplatinic acid with a monohydric alcohol, a complex of chloroplatinic acid and olefins, and platinum bisacetoacetate, which are known and usable. The platinum catalyst may be used in an amount of 0.005 mass ppm or more and less than 1.0 mass ppm in terms of platinum metal relative to the total amount of the organohydrogensiloxane represented by the general formula (2), the compound represented by the general formula (3), and the platinum catalyst. With an amount of platinum catalyst of 0.005 mass ppm or more, the hydrosilylation reaction proceeds sufficiently. With an amount of platinum catalyst of less than 1.0 mass ppm, side reactions can be suppressed at the terminal reaction site of the organosiloxane.

The amount of the platinum catalyst is more preferably 0.005 mass ppm or more and 0.5 mass ppm or less, still more preferably 0.005 mass ppm or more and 0.2 mass ppm or less, and furthermore preferably 0.01 mass ppm or more and 0.10 mass ppm or less.

The carbinol-modified polyorganosiloxane may be prepared by the following steps;

step (i): continuously supplying an organohydrogensiloxane represented by the following general formula (2), a compound represented by the following general formula (3), and a platinum catalyst to a reactor;

step (ii): passing the materials (2) and (3) and the platinum catalyst through the reactor to cause a hydrosilylation reaction; and step (iii): taking out the reaction product.

Step (i)

In the step (i), the materials (2) and (3) and the platinum catalyst may be independently and continuously supplied to the reactor through supply pipes, respectively. Alternatively, the materials (2) and (3) and a part or all of the platinum catalyst may be mixed in advance in a tank equipped with a stirrer and then continuously supplied to the reactor.

It is preferable that the reactor be a tubular reactor. The tubular reactor is not particularly limited, and may be appropriately selected from known flow reactors that allow the materials (2) and (3) and a platinum catalyst to pass through for causing a reaction.

Although the temperature of the materials (2) and (3) and the platinum catalyst supplied is not particularly limited in the step (i), in order to smoothly proceed the reaction in the step (ii), the temperature is preferably 0° C. or more and 150° C. or less, more preferably, 10° C. or more and 100° C. or less, and still more preferably 20° C. or more and 80° C. or less.

In the step (i), a solvent may be added in addition to the materials (2) and (3) and the platinum catalyst.

Specific examples of the solvent include alkanes such as pentane, hexane, octane, decane, isododecane, cyclopentane, cyclohexane, methylcyclohexane and ethylcyclohexane; aromatic hydrocarbons such as benzene, toluene, xylene and ethylbenzene; ethers such as diethyl ether, ethyl propyl ether, glyme and diglyme; and alcohols such as ethanol, 1-propanol and 2-propanol.

Step (ii)

The step (ii) is a step of passing the materials (2) and (3) and the platinum catalyst through a reactor to cause a hydrosilylation reaction.

The temperature in the reactor in the present step is preferably 20° C. or more and 180° C. or less, more preferably 40° C. or more and 150° C. or less, and still more preferably 50° C. or more and 120° C. or less, from the viewpoint of improving the reaction efficiency and suppressing a side reaction, though not particularly limited.

The total time of the step (i) and the step (ii) is preferably 1 minute or more and 60 minutes or less, more preferably 3 minutes or more and 45 minutes or less, and still more preferably 5 minutes or more and 30 minutes or less, from the viewpoint of production efficiency, though not particularly limited.

Step (iii)

The step (iii) is a step of taking out the reaction product obtained in the step (ii).

The amount taken out depends on the amount supplied in the step (i), preferably 100 kg/h or more, more preferably 200 kg/h or more, and still more preferably 300 kg/h, from the viewpoint of efficient production, though not particularly limited.

The reaction product taken out may be used as it is, or may be refined for use on an as needed basis by a known method. For example, the step (iv) of removing the compound represented by the general formula (3) is included. As a specific example of the step (iv), the unnecessary compound represented by the general formula (3) is removed by heating, for example, at 160° C. using a thin film evaporator.

By using the carbinol-modified polyorganosiloxane described above, the final platinum content in the PC-POS copolymer can be controlled to the value described above.

Examples of a preferred embodiment of the polycarbonate-polyorganosiloxane include a carbinol-modified polyorganosiloxane represented by the following general formula (222), with $R^a$ in formula (222) having a ratio [number of group represented by formula (vi)]/[total number of group represented by formula (v) and group represented by formula (vi)] of less than 0.01:

[Formula 35]

(222)

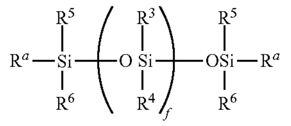

wherein $R^3$ to $R^6$ and f are as described above, and each $R^a$ is independently a group represented by the following general formula (v) or (vi):

[Formula 36]

$$—(CH_2)_k—Z—OH \quad (v)$$

wherein Z represents a divalent hydrocarbon group, and at least one of the hydrogen atoms contained in the divalent hydrocarbon group is optionally replaced by a halogen atom or a monovalent hydrocarbon group having 1 to 20 carbon atoms; at least one of the carbon atoms in each of the divalent hydrocarbon group and the monovalent hydrocarbon group is optionally replaced by an oxygen atom, a nitrogen atom or a sulfur atom; and k is 2 or 3;

[Formula 37]

$$—O—Z—R^{33} \quad (vi)$$

wherein Z is the same as in the formula (v); $R^{33}$ represents a vinyl group, an allyl group, or a terminal group having $—(CH_2)_k—SiR^5R^6O—$ derived from a reaction between Si—H of the following general formula (2) and a vinyl group or an allyl group; and k is 2 or 3:

[Formula 38]

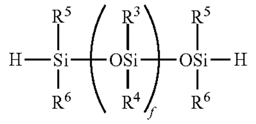

(2)

wherein $R^3$ to $R^6$ and f are as described above.

In the case where the ratio [number of group represented by formula (vi)]/[total number of group represented by formula (v) and group represented by formula (vi)] is less than 0.01, the occurrence of side reaction products can be suppressed, and degradation of the transparency and color tone of the copolymer obtained from carbinol-modified polyorganosiloxane formed at high temperature can be suppressed, so that the appearance of a molded article of the copolymer can be suitably maintained.

The ratio [number of group represented by formula (vi)]/[total number of group represented by formula (v) and group represented by formula (vi)] is more preferably 0.008 or less, still more preferably 0.006 or less. Further, it is more preferable that the ratio be 0.005 or less.

The carbinol-modified polyorganosiloxane having the ratio [number of group represented by formula (vi)]/[total number of group represented by formula (v) and group represented by formula (vi)] described above may be obtained through a hydrosilylation reaction of an organohydrogensiloxane represented by the general formula (2), a compound represented by the general formula (3), and a platinum catalyst that are continuously supplied to a reactor and passed through the reactor.

The ratio in the present specification is a value calculated from the integrated value derived from Si of the $—O—Si(R^5)(R^6)—CH_2—$ structure based on the formula (v) in the $^{29}$Si-NMR spectrum and the integrated value derived from Si of the $—O—Si(R^5)(R^6)—O—Z—$ structure based on the formula (vi).

Examples of another preferred embodiment of the polycarbonate-polyorganosiloxane include a polycarbonate-polyorganosiloxane copolymer obtained from a carbinol-modified polyorganosiloxane represented by the following general formula (223), with $R^b$ in formula (223) having a ratio [number of hydroxy group]/[total number of hydroxy group and group represented by formula (v)] of less than 0.01:

[Formula 39]

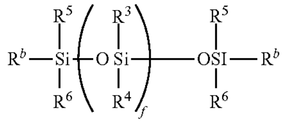

(223)

wherein $R^3$ to $R^6$ and f are as described above, and each $R^b$ is independently a hydroxy group or a group represented by the following general formula (v):

[Formula 40]

$$—(CH_2)_k—Z—OH \quad (v)$$

wherein Z is as described above, and k is 2 or 3.

In the case where the ratio [number of hydroxy groups]/[total number of hydroxy groups and the group represented by the formula (v)] is less than 0.01, the occurrence of side reaction products can be suppressed and degradation of the transparency and color tone of the copolymer obtained from carbinol-modified polyorganosiloxane formed at high temperature can be suppressed, so that the appearance of a molded article of the copolymer can be suitably maintained.

The ratio [number of hydroxy groups]/[total number of hydroxy groups and the group represented by the formula (v)] is more preferably 0.008 or less, still more preferably 0.006 or less. Further, it is more preferable that the ratio be 0.005 or less.

The carbinol-modified polyorganosiloxane having the ratio [number of hydroxy groups]/[total number of hydroxy groups and the group represented by the formula (v)] described above may be obtained through a hydrosilylation reaction of an organohydrogensiloxane represented by the general formula (2), a compound represented by the general formula (3), and a platinum catalyst that are continuously supplied to a reactor and passed through the reactor.

The ratio in the present specification is a value calculated from the integrated value derived from Si of the $—O—Si(R^5)(R^6)—CH_2—$ structure based on the formula (v) in the $^{29}$Si-NMR spectrum and the integrated value derived from Si of the $—O—Si(R^5)(R^6)—OH$ structure based on the formula (vi).

The polycarbonate-polyorganosiloxane copolymer may be produced by adding polyorganosiloxane to a reaction system for polymerizing a dihydric phenol and a carbonate precursor, and subjecting the mixture to an interfacial polymerization method (phosgene method), a transesterification method (melting method), or the like. In the interfacial polymerization method, phosgene, triphosgene or the like may be used as carbonate precursor, and in the transesterification method, diphenyl carbonate may be used as carbonate precursor. Alternatively, as described below, a method including reacting dihydric phenol with phosgene to prepare a bisphenol monomer or bisphenol polycarbonate oligomer having a chloroformate structure at both ends, and then reacting the bisphenol monomer or bisphenol polycarbonate oligomer with a polyorganosiloxane may be suitably employed. In particular, in the case where an interfacial polymerization method is employed, a step for separating an organic phase containing the PC-POS copolymer from an aqueous phase containing unreacted substances and catalyst residues is easy, so that in each of the washing steps such as alkaline washing, acid washing, and pure water washing, separation between the organic phase containing the PC-POS copolymer and the aqueous phase is easily performed. As a result, a PC-POS copolymer may be efficiently obtained. For example, the method described in JP 2014-80462 A may be referred to as a method for producing a PC-POS copolymer.

A specific production method of the PC-POS copolymer is as follows. A previously produced polycarbonate oligomer described below and a carbinol-modified polyorganosiloxane are dissolved in a water-insoluble organic solvent (methylene chloride, etc.), and to the mixture, an alkaline aqueous solution (sodium hydroxide aqueous solution, etc.)

of dihydric phenolic compound (bisphenol A, etc.) is added. With use of a tertiary amine (triethylamine, etc.) or a quaternary ammonium salt (trimethylbenzyl ammonium chloride, etc.) as a polymerization catalyst, an interfacial polycondensation reaction is performed in the presence of a terminal terminator (monohydric phenol such as p-tert-butylphenol). Alternatively, the PC-POS copolymer may be produced by copolymerization of a carbinol-modified polyorganosiloxane, a dihydric phenol, and phosgene, a carbonate ester, or a chloroformate.

A polycarbonate oligomer may be produced by reacting dihydric phenol with a carbonate precursors such as phosgene and triphosgene in an organic solvent such as methylene chloride, chlorobenzene and chloroform. In the case where the polycarbonate oligomer is produced by a trans-esterification method, production may be performed through a reaction between a dihydric phenol and a carbonate precursor such as diphenyl carbonate.

It is preferable that the dihydric phenol for use be a dihydric phenol represented by the following general formula (viii):

[Formula 41]

(viii)

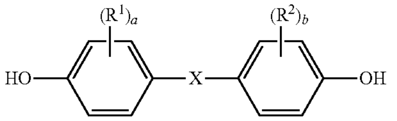

wherein $R^1$, $R^2$, a, b and X are as described above.

Examples of the dihydric phenol represented by the general formula (viii) include a bis(hydroxyphenyl)alkane such as 2,2-bis(4-hydroxyphenyl) propane [bisphenol A], bis(4-hydroxyphenyl) methane, 1,1-bis(4-Hydroxyphenyl) ethane, and 2,2-bis(4-hydroxy-3,5-dimethylphenyl) propane; 4,4'-dihydroxydiphenyl, bis(4-hydroxyphenyl)cycloalkane, bis(4-hydroxyphenyl) oxide, bis(4-hydroxyphenyl) sulfide, bis(4-hydroxyphenyl) sulfone, bis(4-hydroxyphenyl) sulfoxide, and bis(4-hydroxyphenyl) ketone. One of these dihydric phenols may be used alone, or two or more thereof may be mixed for use.

Among these, bis(hydroxyphenyl)alkane-based dihydric phenol is preferred, and bisphenol A is more preferred. In the case where bisphenol A is used as the dihydric phenol, a PC-POS copolymer having an isopropylidene group as X, and a=b=0 in the general formula (I), is obtained.

Examples of the dihydric phenols other than bisphenol A include bis(hydroxyaryl)alkanes, bis(hydroxyaryl)cycloalkanes, dihydroxyaryl ethers, dihydroxydiaryl sulfides, dihydroxydiaryl sulfoxides, dihydroxydiaryl sulfones, dihydroxydiphenyls, dihydroxydiaryl fluorenes and dihydroxydiaryl adamantanes. One of these dihydric phenols may be used alone, or two or more thereof may be mixed for use.

Examples of the bis(hydroxyaryl)alkanes include bis(4-hydroxyphenyl)methane, 1,1-bis(4-hydroxyphenyl)ethane, 2,2-bis(4-hydroxyphenyl)butane, 2,2-bis(4-hydroxyphenyl) octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-3-tert-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl) propane, and 2,2-bis(4-hydroxy-3,5-dibromophenyl) propane.

Examples of the bis(hydroxyaryl)cycloalkanes include 1,1-bis (4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane and 1,1-bis(4-hydroxyphenyl)cyclododecane. Examples of the dihydroxyaryl ethers include 4,4'-dihydroxydiphenyl ether and 4,4'-dihydroxy-3,3'-dimethylphenyl ether.

Examples of the dihydroxydiaryl sulfides include 4,4'-dihydroxydiphenyl sulfide and 4,4'-dihydroxy-3,3'-dimethyldiphenyl sulfide. Examples of the dihydroxydiaryl sulfoxides include 4,4'-dihydroxydiphenyl sulfoxide and 4,4'-dihydroxy-3,3'-dimethyldiphenyl sulfoxide. Examples of the dihydroxydiaryl sulfones include 4,4'-dihydroxydiphenyl sulfone and 4,4'-dihydroxy-3,3'-dimethyldiphenyl sulfone.

Examples of the dihydroxydiphenyls include 4,4'-dihydroxydiphenyl. Examples of the dihydroxydiaryl fluorenes include 9,9-bis(4-hydroxyphenyl)fluorene and 9,9-bis(4-hydroxy-3-methylphenyl)fluorene. Examples of the dihydroxydiaryl adamantanes include 1,3-bis(4-hydroxyphenyl) adamantane, 2,2-bis(4-hydroxyphenyl)adamantane, and 1,3-bis(4-hydroxyphenyl)-5,7-dimethyl adamantane.

Examples of the dihydric phenols other than the above include 4,4'-[1,3-phenylenebis (1-methylethylidene)] bisphenol, 10,10-bis(4-hydroxyphenyl)-9-anthrone and 1,5-bis (4-hydroxyphenylthio)-2,3-dioxapentane.

A terminal terminator (molecular weight modifier) may be used to adjust the molecular weight of the resulting PC-POS copolymer. Examples of the terminal terminator include a monohydric phenol such as phenol, p-cresol, p-tert-butylphenol, p-tert-octylphenol, p-cumylphenol, p-nonylphenol, m-pentadecylphenol and p-tert-amylphenol. These monohydric phenols may be used alone or in combination of two or more.

The polycarbonate-polyorganosiloxane copolymer in an embodiment of the present invention may be obtained by reacting a carbinol-modified polyorganosiloxane represented by the general formula (222) with a dihydric phenol and a carbonate precursor, or with a polycarbonate oligomer. Therefore, the copolymer may have a polyorganosiloxane unit represented by the following general formula (222-i).

[Formula 42]

(222-i)

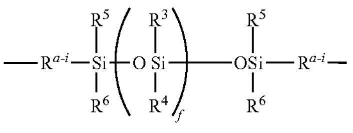

wherein $R^3$ to $R^6$ and f are as described above, and each $R^{a-i}$ is independently a group represented by the following general formula (v-i):

[Formula 43]

$$—(CH_2)_k—Z—O—$$ (v-i)

wherein Z represents a divalent hydrocarbon group, and at least one of the hydrogen atoms contained in the divalent hydrocarbon group is optionally replaced by a halogen atom or a monovalent hydrocarbon group having 1 to 20 carbon atoms; at least one of the carbon atoms in the divalent hydrocarbon group or the monovalent hydrocarbon group is optionally replaced by an oxygen atom, a nitrogen atom or a sulfur atom; the oxygen atom in the formula (v-i) is bonded to a polycarbonate unit; and k represents an integer of 2 or 3.

In the polyorganosiloxane unit represented by the general formula (222-i), $(CH_2)_k$ of the $R^{a-i}$ group represented by the general formula (v-i) is directly bonded to a silicon atom (Si).

The carbinol-modified polyorganosiloxane represented by the general formula (222) may contain a group represented by the formula (vi) among $R^a$ in the formula (222), and as described above, it is preferable that ratio [total number of group represented by (vi)]/[total number of groups represented by formula (v) and formula (vi)] be less than 0.01. In other words, the polycarbonate-polyorganosiloxane copolymer according to an embodiment of the present invention may include a polycarbonate-polyorganosiloxane copolymer represented by the following general formula (b) having the compound represented by formula (vi) incorporated at the terminal, and a compound represented by the following general formula (c) that remains without reacting with the carbonate precursor, dihydric phenol, or polycarbonate oligomer, in addition to polycarbonate-polyorganosiloxane copolymer having the polyorganosiloxane unit represented by the general formula (222-i):

[Formula 44]

(b)

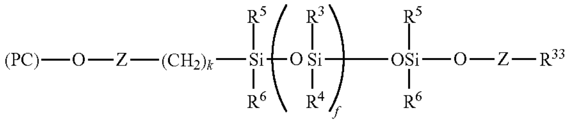

wherein $R^3$ to $R^6$, Z, $R^{33}$, f and k are as described above, and (PC) represents a bond to a polycarbonate block;

[Formlua 45]

(c)

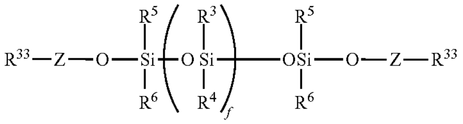

wherein $R^3$ to $R^6$, Z, $R^{33}$, and f are as described above.

The polycarbonate-polyorganosiloxane copolymer represented by the formula (b) and the compound represented by the formula (c) are contained as so-called "impurities" in the polycarbonate-polyorganosiloxane copolymer of the present embodiment. In the preferable proportion thereof, the ratio [total number of group represented by {—O—Z—$R^{33}$} in formula (b) and formula (c)]/[total number of group represented by formula (v-i) and group represented by {—O—Z—$R^{33}$} in formula (b) and formula (c)] is less than 0.01. With a ratio of less than 0.01, degradation of transparency and color tone in molding of the PC-POS copolymer at high temperature is suppressed, and the Δhaze value of the PC-POS copolymer can be controlled to the value described above, so that the appearance of a molded article of the copolymer can be suitably maintained.

The ratio [total number of group represented by {—O—Z—$R^{33}$} in formula (b) and formula (c)]/[total number of group represented by formula (v-i) and group represented by {—O—Z—$R^{33}$} in formula (b) and formula (c)] is more preferably 0.008 or less, still more preferably 0.006 or less. It is also more preferable that the ratio be 0.005 or less.

The PC-POS copolymer having the ratio [total number of group represented by {—O—Z—$R^{33}$} in formula (b) and formula (c)]/[total number of group represented by formula (v-i) and group represented by {—O—Z—$R^{33}$} in formula (b) and formula (c)] described above may be obtained, for example, from a carbinol-modified polyorganosiloxane having a ratio [total number of group represented by formula (vi)]/[total number of group represented by formula (v) and group represented by formula (vi)] of less than 0.01.

The ratio in the present specification is a value calculated from the integrated value derived from Si of the —O—Si$(R^5)(R^6)$—$CH_2$— structure based on the formula (v-i) in the $^{29}$Si-NMR spectrum and the integrated value derived from Si of the —O—Si$(R^5)(R^6)$—O—Z— structure based on the formula (b) and formula (c).

The polycarbonate-polyorganosiloxane copolymer in an embodiment of the present invention may be obtained by reacting a carbinol-modified polyorganosiloxane represented by the general formula (223) with a dihydric phenol and a carbonate precursor, or with a polycarbonate oligomer. Therefore, the copolymer may have a polyorganosiloxane unit represented by the following general formula (223-i).

[Formula 46]

(223-i)

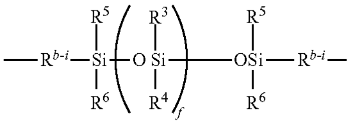

wherein $R^3$ to $R^6$ and f are as described above, and each $R^{b-i}$ is independently a group represented by the following general formula (v-i):

[Formula 47]

$$—(CH_2)_k—Z—O— \quad \text{(v-i)}$$

wherein Z represents a divalent hydrocarbon group, and at least one of the hydrogen atoms contained in the divalent hydrocarbon group is optionally replaced by a halogen atom or a monovalent hydrocarbon group having 1 to 20 carbon atoms; at least one of the carbon atoms in the divalent hydrocarbon group or the monovalent hydrocarbon group is optionally replaced by an oxygen atom, a nitrogen atom or a sulfur atom; the oxygen atom in the formula (v-i) is bonded to a polycarbonate unit; and k represents an integer of 2 or 3.

In the polyorganosiloxane unit represented by the general formula (223-i), $(CH_2)_k$ of the $R^{b-i}$ group represented by the general formula (v-i) is directly bonded to a silicon atom (Si).

The carbinol-modified polyorganosiloxane represented by the general formula (223) may contain a hydroxy group as $R^b$ in the formula (223) as described above. In other words, the polycarbonate-polyorganosiloxane copolymer according to an embodiment of the present invention may include a polycarbonate-polyorganosiloxane copolymer represented by the following general formula (d) having a hydroxy group incorporated at the terminal, and a compound represented by the following general formula (e) that remains without reacting with the carbonate precursor, dihydric phenol, or polycarbonate oligomer, in addition to polycarbonate-polyorganosiloxane copolymer having the polyorganosiloxane unit represented by the general formula (222-i), and impurities represented by the general formulas (b) and (c):

[Formula 48]

(d)

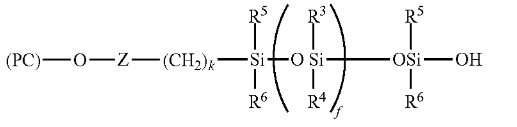

wherein $R^3$ to $R^6$, f and k are as described above, and (PC) represents a bond to a polycarbonate block;

[Formula 49]

(e)

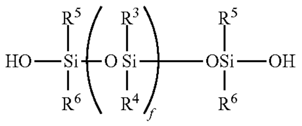

wherein $R^3$ to $R^6$, and f are as described above.

The polycarbonate-polyorganosiloxane polymer represented by the formula (d) and the compound represented by the formula (e) also are contained as so-called "impurities" in the polycarbonate-polyorganosiloxane copolymer of the present embodiment. As the preferable proportion thereof, the ratio [total number of hydroxy group in formula (d) and formula (e)]/[total number of group represented by formula (v-i) and hydroxy group in formula (d) and formula (e)] is less than 0.01. With a ratio of less than 0.01, degradation of transparency and color tone in molding of the PC-POS copolymer at high temperature is suppressed, and the Δhaze value of the PC-POS copolymer can be controlled to the value described above, so that the appearance of a molded article of the copolymer can be suitably maintained.

The ratio [total number of hydroxy group in formula (d) and formula (e)]/[total number of group represented by formula (v-i) and hydroxy group in formula (d) and formula (e)] is more preferably 0.008 or less, still more preferably 0.006 or less. It is also more preferable that the ratio be 0.005 or less.

The PC-POS copolymer having the ratio [total number of hydroxy group in formula (d) and formula (e)]/[total number of group represented by formula (v-i) and hydroxy group in formula (d) and formula (e)] described above may be obtained, for example, from a carbinol-modified polyorganosiloxane represented by the formula (223), having a ratio [number of hydroxy group]/[total number of hydroxy group and group represented by formula (v)] of less than 0.01 among $R^b$ in the formula (223).

The ratio in the present specification is a value calculated from the integrated value derived from Si of the $—O—Si(R^5)(R^6)—CH_2—$ structure based on the formula (v-i) in the $^{29}$Si-NMR spectrum and the integrated value derived from Si of the $—O—Si(R^5)(R^6)—OH$ structure based on the formula (d) and formula (e). Accordingly, the ratio [total number of hydroxy group in formula (d) and formula (e)]/[total number of group represented by formula (v-i) and hydroxy group in formula (d) and formula (e)] can be rephrased as the ratio [total number of hydroxy group in formula (d) and formula (e)]/[total number of group represented by $—O—Si(R^5)(R^6)—CH_2—$ and hydroxy group in formula (d) and formula (e)].

The polycarbonate-polyorganosiloxane copolymer in another embodiment comprises a polycarbonate block (A-1) formed of a repeating unit represented by the following general formula (I) and a polyorganosiloxane block (A-2) containing a repeating unit represented by the following general formula (II), wherein a difference between the haze value (haze A) after retention for 3 minutes and the haze value (haze B) after retention for 20 minutes, of the polycarbonate-polyorganosiloxane copolymer at 300° C. or 340° C., Δhaze, is less than 0.4, and the polycarbonate-polyorganosiloxane copolymer includes a polycarbonate-polyorganosiloxane copolymer represented by the following general formula (f) and a compound represented by the following general formula (g), with a ratio [total number of hydroxy group in formula (f and formula (g)]/[total number of group represented by formula (v-i) and hydroxy group in formula (f) and formula (f)] of less than 0.01:

[Formula 50]

(I)

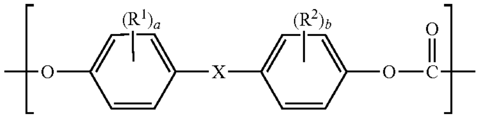

(II)

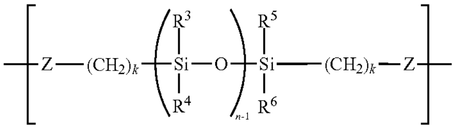

wherein $R^1$ to $R^6$, X, Z, a, b, n and k are as described above;

[Formula 51]

$$—(CH_2)_k—Z—$$ (v-ii)

wherein Z is as described above, and k is 2 or 3;

[Formula 52]

(f)

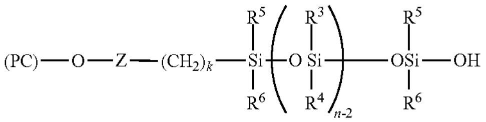

wherein $R^3$ to $R^6$, n and k are as described above, and (PC) represents a bond to a polycarbonate block;

[Formula 53]

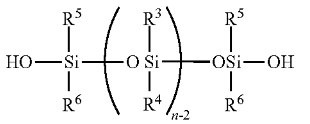

(g)

wherein $R^3$ to $R^6$ and n are as described above.

The polycarbonate-polyorganosiloxane copolymer represented by the formula (f) and the compound represented by the formula (g) are contained as so-called "impurities" in the polycarbonate-polyorganosiloxane copolymer of the present embodiment. As the preferable proportion thereof, the ratio [total number of hydroxy group in formula (f) and formula (g)]/[total number of group represented by formula (v-ii) and hydroxy group in formula (f) and formula (g)] is less than 0.01. With a ratio of less than 0.01, degradation of transparency and color tone in molding of the PC-POS copolymer at high temperature is suppressed, and the Δhaze value of the PC-POS copolymer can be controlled to the value described above, so that the appearance of a molded article of the copolymer can be suitably maintained.

The group represented by the formula (v-ii) is included in the polycarbonate-polyorganosiloxane copolymer including the polycarbonate block (A-1) and the polyorganosiloxane block (A-2) and in the polycarbonate-polyorganosiloxane copolymer represented by the formula (f).

The ratio [total number of hydroxy group in formula (f) and formula (g)]/[total number of group represented by formula (v-ii) and hydroxy group in formula (f) and formula (g)] is more preferably 0.008 or less, still more preferably 0.006 or less. It is also more preferable that the ratio be 0.005 or less.

The PC-POS copolymer having the ratio [total number of hydroxy group in formula (f) and formula (g)]/[total number of group represented by formula (v-ii) and hydroxy group in formula (f) and formula (g)] described above may be obtained, for example, from a carbinol-modified polyorganosiloxane represented by the general formula (223), having a ratio [number of hydroxy group]/[total number of hydroxy group and group represented by formula (v)] of less than 0.01 among $R^b$ in the formula (223).

The ratio in the present specification is a value calculated from the integrated value derived from Si of the —O—Si$(R^5)(R^6)$—$CH_2$— structure based on the formula (v-ii) in the $^{29}$Si-NMR spectrum and the integrated value derived from Si of the —O—Si$(R^5)(R^6)$—OH structure based on the formula (f and formula (g). Accordingly, the ratio [total number of hydroxy group in formula (f and formula (g)]/[total number of group represented by formula (v-ii) and hydroxy group in formula (f) and formula (g)] can be rephrased as the ratio [total number of hydroxy group in formula (f and formula (g)]/[total number of group represented by —O—Si$(R^5)(R^6)$—$CH_2$— and hydroxy group in formula (f) and formula (g)].

After the interfacial polycondensation reaction, the mixture is appropriately allowed to stand to separate into an aqueous phase and an organic solvent phase [separation step], and the organic solvent phase is washed (preferably in the order of basic aqueous solution, acidic aqueous solution, and water) [washing step], the obtained organic phase is concentrated [concentration step], and dried [drying step] to obtain a PC-POS copolymer.

The polycarbonate-polyorganosiloxane copolymer of the present invention is characterized in that a difference between the haze value (haze A) after retention for 3 minutes and the haze value (haze B) after retention for 20 minutes, of the copolymer or the composition thereof at 300° C. or 340° C., Δhaze, is less than 0.4. In the case where there exists no difference in the haze value at a retention temperature of 300° C., a retention temperature of 340° C. is used. Generally, in the case where the average chain length of a polyorganosiloxane is long, the haze difference may not be clear at 300° C. In that case, the haze difference is measured at a retention temperature of 340° C., though not limited to the description. The characteristics show that the PC-POS copolymer of the present invention is excellent in transparency and thermal stability Without being bound to a theory, through such a retention test, the siloxane portion is generally decomposed to have poor compatibility with the polycarbonate block portion, so that the haze value tends to increase due to white turbidity. Surprisingly, the present inventors have found that the PC-POS copolymer having a polycarbonate block having a specific structure and a polyorganosiloxane block having a specific structure is excellent in transparency and thermal stability as described above.

The Δhaze value is preferably 0.3 or less, more preferably 0.2 or less.

The specific platinum content of the polycarbonate-polyorganosiloxane copolymer of the present invention is 0.05 mass ppb or more and less than 0.5 mass ppm. The platinum content of the PC-POS copolymer of the present invention is in the range is preferred, because coloring of the PC-POS copolymer caused by platinum can be prevented.

The upper limit of the platinum content of the PC-POS copolymer of the present invention is more preferably 0.4 mass ppm or less, still more preferably 0.3 mass ppm or less, furthermore preferably 0.1 mass ppm or less, furthermore preferably 50 mass ppb or less, furthermore preferably 10 mass ppb or less, and particularly preferably 1.0 mass ppb or less.

The platinum content in the polyorganosiloxane in the present invention is measured with an ICP emission analyzer.

Specifically, after organic matter in PC-POS copolymer is subjected to a sulfuric acid ashing treatment, the residue is dissolved in hydrofluoric acid and aqua regia, and the solution is subjected to the measurement with an ICP emission analyzer (for example, trade name: "SPS5100", manufactured by Hitachi High-Tech Science Corporation) under the measurement conditions of a calibration curve method.

The average chain length n of the polyorganosiloxane block (A-2) in the PC-POS copolymer is preferably 10 or more and 300 or less.

The average chain length is calculated by nuclear magnetic resonance (NMR) measurement. In the case where the average chain length of the polycarbonate-polyorganosiloxane copolymer is 10 or more and 300 or less, the finally resulting polycarbonate-based resin composition is excellent in impact resistance and the like. Although the reason is not clear, it has been found that the polycarbonate-based resin composition of the present invention has extremely excellent impact resistance.

The average chain length n of the polyorganosiloxane block (A-2) is more preferably 30 or more, still more preferably 35 or more, furthermore preferably 40 or more, more preferably 200 or less, still more preferably 150 or less, furthermore preferably 100 or less, and particularly preferably 95 or less.

The content of the polyorganosiloxane block (A-2) in the PC-POS copolymer is preferably 1 mass % or more and 50 mass % or less. In the case where the content of polyorganosiloxane in the PC-POS copolymer is in the range, more excellent impact resistance can be obtained. In addition, degradation of handling properties due to high content of polyorganosiloxane can be avoided. A content of the polyorganosiloxane equal to or less than the upper limit is preferred, because the resulting copolymer can be sufficiently pulverized, so that powder aggregation and the like can be avoided.

The content of the polyorganosiloxane block (A-2) in the PC-POS copolymer is more preferably 2 mass % or more, still more preferably 3 mass % or more, particularly preferably 4 mass % or more, preferably 45 mass % or less, more preferably 30 mass % or less, still more preferably 15 mass % or less, and particularly preferably 7 mass % or less.

The viscosity average molecular weight (Mv) of the PC-POS copolymer may be appropriately adjusted by using a molecular weight modifier (terminal terminator) or the like, such that the desired molecular weight can be obtained depending on the intended use and product. The viscosity average molecular weight of the PC-POS copolymer is preferably 9000 or more and 50000 or less. In the case where the viscosity average molecular weight is 9000 or more, a molded article having higher strength can be obtained. In the case where the viscosity average molecular weight is 50000 or less, injection molding or extrusion molding can be performed more easily at a temperature where no thermal deterioration is caused.

The viscosity average molecular weight of the PC-POS copolymer is more preferably 12000 or more, still more preferably 14000 or more, particularly preferably 16000 or more, more preferably 30000 or less, still more preferably 23000 or less, particularly preferably 22000 or less, and most preferably 20000 or less.

The viscosity average molecular weight (Mv) is a value calculated from the following Schnell's formula through measurement of the limiting viscosity [η] of the methylene chloride solution at 20° C.

$$[\eta] = 1.23 \times 10^{-5} \times Mv^{0.83} \quad \text{[Numerical Formula 1]}$$

<Polycarbonate Resin Composition>

According to an embodiment of the present invention, a polycarbonate-based resin composition containing the PC-POS copolymer can be provided.

The polycarbonate-based resin composition may contain other PC-POS copolymers and other additives within a range where the effects of the present invention are not impaired.

Examples of the other PC-POS copolymers include ones having the following structure.

[Formula 54]

(i-I)

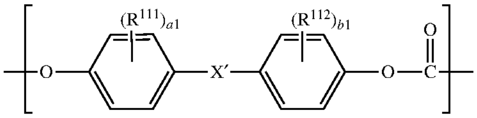

-continued (i-II)

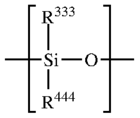

The PC-POS copolymer has a structure other than PC-POS copolymer and is not particularly limited. $R^{111}$, $R^{112}$, X', a1 and b1 in the formula (i-I) are the same as $R^1$, $R^2$, X, a and b detailed in the formula (I), respectively, and the same applies to the preferred ones and preferred combinations. $R^{333}$ and $R^{444}$ in the formula (i-II) are each independently a hydrogen atom, a halogen atom, an alkyl group having 1 to 6 carbon atoms, an alkoxy group having 1 to 6 carbon atoms, or an aryl group having 6 to 12 carbon atoms.

In the general formula (i-II), examples of the halogen atoms each independently represented by $R^{333}$ or $R^{444}$ include a fluorine atom, a chlorine atom, a bromine atom, and a iodine atom. Examples of the alkyl groups each independently represented by $R^{333}$ or $R^{444}$ include a methyl group, an ethyl group, a n-propyl group, an isopropyl group, various butyl groups, various pentyl groups, and various hexyl groups. Examples of the alkoxy groups each independently represented by $R^{333}$ or $R^{444}$ include ones having an alkyl group moiety of the alkyl group. Examples of the aryl groups each independently represented by $R^{333}$ or $R^{444}$ include a phenyl group and a naphthyl group.

Any of $R^{333}$ and $R^{444}$ is preferably a hydrogen atom, an alkyl group having 1 to 6 carbon atoms, an alkoxy group having 1 to 6 carbon atoms, or an aryl group having 6 to 12 carbon atoms, and more preferably a methyl group.

It is preferable that the polyorganosiloxane block (A-2) containing the repeating unit represented by the general formula (i-II) have the units represented by the following general formulas (II-i) to (II-iii).

[Formula 55]

(II-i)

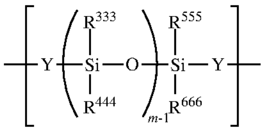

(II-ii)

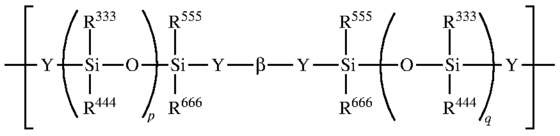

(II-iii)

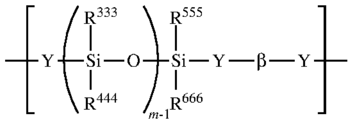

wherein $R^{333}$ to $R^{666}$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^{333}$ to $R^{666}$ may be identical to or different from each other; Y represents $—R^7O—$, $—R^7COO—$, $—R^7NH—$, $—R^7NR^8—$, —COO—, —S—, —$R^7$COO—$R^9$—O— or —$R^7$O—$R^{10}$—O—, and a plurality of Y may be identical to or different from each other; $R^7$ represents a single bond, a straight chain, branched chain or cyclic alkylene group, an aryl-substituted alkylene group, a substituted or unsubstituted arylene group or diarylene group; $R^8$ represents an alkyl group, an alkenyl group, an aryl group, or an aralkyl group; $R^9$ represents a diarylene group; $R^{10}$ represents a straight chain, branched chain or cyclic alkylene group, or a diarylene group; β represents a divalent group derived from a diisocyanate compound, or a divalent group derived from a dicarboxylic acid or a halide of dicarboxylic acid; m represents the average chain length of polyorganosiloxane, m−1, p and q each represent the number of repetitions of the polyorganosiloxane unit and are each an integer of 1 or more, and the sum of p and q is m−2.

Examples of the halogen atoms each independently represented by $R^{333}$ to $R^{666}$ include a fluorine atom, a chlorine atom, a bromine atom, and a iodine atom. Examples of the alkyl groups each independently represented by $R^{333}$ to $R^{666}$ include a methyl group, an ethyl group, a n-propyl group, an isopropyl group, various butyl groups, various pentyl groups, and various hexyl groups. Examples of the alkoxy groups each independently represented by $R^{333}$ to $R^{666}$ include ones having an alkyl group moiety of the alkyl group. Examples of the aryl groups each independently represented by $R^{333}$ to $R^{666}$ include a phenyl group and a naphthyl group.

$R^{333}$ to $R^{666}$ are preferably a hydrogen atom, an alkyl group having 1 to 6 carbon atoms, an alkoxy group having 1 to 6 carbon atoms, or an aryl group having 6 to 12 carbon atoms.

It is preferable that all of $R^3$ to $R^6$ in the general formulas (II-i), (II-ii) and/or (II-iii) be a methyl group.

In —$R^7$O—, —$R^7$COO—, —$R^7$NH—, —$R^7$N$R^8$—, —$R^7$COO—$R^9$—O— or —$R^7$O—$R^{10}$—O-represented by Y, examples of the straight chain or branched chain alkylene group represented by $R^7$ include an alkylene group having 1 to 8 carbon atoms, preferably 1 to 5 carbon atoms, and examples of the cyclic alkylene group include ones having 5 to 15 carbon atoms, preferably 5 to 10 carbon atoms.

The aryl-substituted alkylene group represented by $R^7$ may have a substituent such as an alkoxy group or an alkyl group on the aromatic ring, and examples of the specific structure thereof include one represented by the following general formula (i) or (ii). In the case where the aryl-substituted alkylene group is included, the alkylene group is bonded to Si:

[Formula 56]

(i)

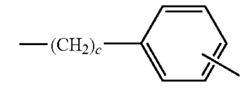

(ii)

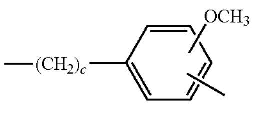

wherein c represents a positive integer, which is usually an integer of 1 to 6.

The diarylene group represented by $R^7$, $R^9$ and $R^{10}$ is a group with two arylene groups directly bonded or through a divalent organic group, and specifically a group having a structure represented by —$Ar^1$—W—$Ar^2$—. $Ar^1$ and $Ar^2$ represent arylene group, and W represents a single bond or a divalent organic group. The divalent organic group represented by W is, for example, an isopropylidene group, a methylene group, a dimethylene group, or a trimethylene group.

Examples of the arylene group represented by $R^7$, $Ar^1$ and $Ar^2$ include an arylene group having 6 to 14 ring-forming carbon atoms such as a phenylene group, a naphthylene group, a biphenylene group and an anthrylene group. These arylene groups may have any substituent such as an alkoxy group and an alkyl group.

The alkyl group represented by $R^8$ is one in a linear or branched chain form having 1 to 8 carbon atoms, preferably 1 to 5 carbon atoms. Examples of the alkenyl group include one in a linear or branched chain form having 2 to 8 carbon atoms, preferably 2 to 5 carbon atoms. Examples of the aryl group include a phenyl group and a naphthyl group. Examples of the aralkyl group include a phenylmethyl group and a phenylethyl group.

The straight chain, branched chain or cyclic alkylene group represented by $R^{10}$ is the same as that of $R^7$.

Preferably, Y is —$R^7$O—, and $R^7$ is an aryl-substituted alkylene group, particularly a residue of a phenolic compound having an alkyl group, and more preferably an organic residue derived from allylphenol or eugenol.

It is preferable that p and q in the formula (II-ii) satisfies: p=q.

β represents a divalent group derived from a diisocyanate compound or a divalent group derived from a dicarboxylic acid or a halide of dicarboxylic acid, and examples thereof include a divalent group represented by the following general formulas (iii) to (vii):

[Formula 57]

(iii)

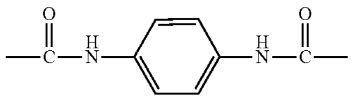

(iv)

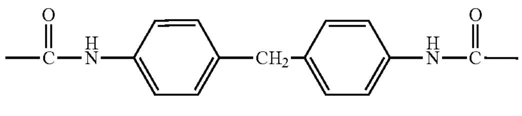

(v)

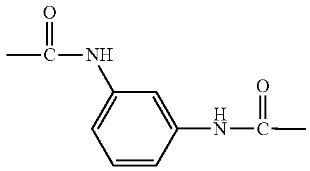

(vi)

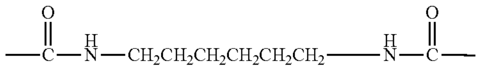

(vii)

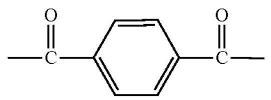

The number of repetitions of the polyorganosiloxane block (A'-2) in the other PC-POS copolymers is preferably 10 or more and 500 or less, more preferably 20 or more and 300 or less, and still more preferably 30 to 150 or less.

The number of repetitions is calculated by nuclear magnetic resonance (NMR) measurement. With the number of repetitions of the polyorganosiloxane block (A'-2) controlled in the range, both excellent transparency and flexibility can be achieved, and peeling after production of a molded article can be suppressed.

The content of the polyorganosiloxane block (A'-2) in the other PC-POS copolymers is preferably 1 mass % or more and 50 mass % or less, more preferably 2 mass % or more and 45 mass % or less, still more preferably 3 mass % or more and 30 mass % or less, and furthermore preferably 3 mass % or more and less than 20 mass %.

The viscosity average molecular weight (Mv) of the other PC-POS copolymers can be appropriately controlled by using a molecular weight modifier (terminal terminator) or the like, such that a desired molecular weight is obtained depending on the intended use and product. The viscosity average molecular weight of the other PC-POS copolymers is preferably 9000 or more and 50000 or less. With a viscosity average molecular weight of 9000 or more, a molded article having higher strength can be obtained. With a viscosity average molecular weight of 50000 or less, injection molding or extrusion molding can be performed more easily at a temperature where no thermal degradation occurs.

The viscosity average molecular weight of the other PC-POS copolymers is more preferably 12000 or more, still more preferably 14000 or more, particularly preferably 16000 or more, more preferably 30000 or less, still more preferably 23000 or less, particularly preferably 22000 or less, and most preferably 20000 or less.

The viscosity average molecular weight (Mv) is a value calculated from the following Schnell's formula through measurement of the limiting viscosity [η] of the methylene chloride solution at 20° C.

$$[\eta] = 1.23 \times 10^{-5} \times Mv^{0.83} \quad \text{[Numerical Formula 2]}$$

The other polycarbonate-polyorganosiloxane copolymers may be produced by a known production method such as an interfacial polymerization method (phosgene method), a pyridine method, or a transesterification method. Particularly, in the case where the interfacial polymerization method is employed, the step of separating an organic phase containing the PC-POS copolymer from an aqueous phase containing an unreacted substance, a catalyst residue, or the like is easy, and hence the separation of the organic phase containing the PC-POS copolymer from the aqueous phase in each washing step such as alkali washing, acid washing and pure water washing is easy. Accordingly, the PC-POS copolymer is efficiently obtained. As a method for producing a PC-POS copolymer, for example, the method described in JP 2014-80462 A may be referred to.

Examples of the other additives include an antioxidant, an alicyclic epoxy compound, a UV absorber, a mold release agent, a reinforcing material, a filler, an elastomer for improving impact resistance, a dye, a pigment, an antistatic agent, and a resin other than polycarbonates.

The compounding and kneading may be performed after premixing with commonly used equipment such as a ribbon blender or a drum tumbler, by using a Henschel mixer, a Banbury mixer, a single screw extruder, a twin screw extruder, a multi-screw screw extruder, or a co-kneader. The heating temperature during kneading is usually appropriately selected in the range of 240° C. or more and 320° C. or less. For the melt-kneading, it is preferable to use an extruder, particularly a vent-type extruder.

[Molded Article]

Using the melt-kneaded polycarbonate-based resin composition of the present invention or the resulting pellets as raw material, various molded articles can be produced by injection molding, injection compression molding, extrusion molding, blow molding, press molding, vacuum molding, foam molding, or using a 3D printer. In particular, pellets obtained by melt-kneading may be suitably used for producing an injection-molded article by injection molding or injection compression molding.

Molded articles made of the PC-POS copolymer of the present invention or polycarbonate resin-based composition containing the copolymer may be suitably used as, for example, exterior and internal parts of electric and electronic equipment such as televisions, radios, cameras, video cameras, audio players, DVD players, air conditioners, mobile phones, smartphones, transceivers, displays, computers, tablet terminals, mobile game devices, stationary game devices, wearable electronic devices, registers, calculators, copiers, printers, facsimiles, communication base stations, batteries, and robots; exterior and internal parts of automobiles, railroad vehicles, ships, aircrafts, space industry equipment, medical equipment; and parts of building materials.

EXAMPLES

The present invention is more specifically described with reference to Examples. However, the present invention is by no means limited by these Examples. In each of Examples, characteristic values and evaluation results were determined in the following manner.

(1) Chain Length and Content of Polydimethylsiloxane

Calculation was performed based on the integrated value ratio of the methyl group of polydimethylsiloxane through NMR measurement. In this specification, polydimethylsiloxane may be abbreviated as PDMS in some cases.

<Method for Determining Chain Length of Polydimethylsiloxane>

$^1$H-NMR measurement conditions

NMR apparatus: ECA-500 manufactured by JEOL RESONANCE Co., Ltd.

Probe: 50TH5AT/FG2

Observation range: −5 to 15 ppm

Observation center: 5 ppm

Pulse repetition time: 9 seconds

Pulse width: 450

NMR sample tube: 5 ϕ

Sample amount: 30 to 40 mg

Solvent: deuterated chloroform

Measurement temperature: room temperature

Number of scans: 256

Case of allylphenol-terminated polydimethylsiloxane

A: integrated value of methyl group of dimethylsiloxane part observed in the vicinity of δ=−0.02 to 0.5

B: integrated value of methylene group of allylphenol observed in the vicinity of δ=2.50 to 2.75

Chain length of polydimethylsiloxane=(A/6)/(B/4)

Case of eugenol-terminated polydimethylsiloxane

A: integrated value of methyl group of dimethylsiloxane part observed in the vicinity of δ=−0.02 to 0.5

B: integrated value of methylene group of eugenol observed in the vicinity of δ=2.40 to 2.70

Chain length of polydimethylsiloxane=(A/6)/(B/4)

<Method for Determining Content of Polydimethylsiloxane>

Method for determining amount of copolymerized polydimethylsiloxane in PTBP-terminated polycarbonate copolymerized with allylphenol-terminated polydimethylsiloxane NMR apparatus: ECA-500 manufactured by JEOL RESONANCE Co., Ltd.

Probe: 50TH5AT/FG2

Observation range: −5 to 15 ppm

Observation center: 5 ppm

Pulse repetition time: 9 seconds

Pulse width: 450

Number of scans: 256

NMR sample tube: 5 ϕ

Sample amount: 30 to 40 mg

Solvent: deuterated chloroform

Measurement temperature: room temperature

A: integrated value of methyl group of BPA part observed in the vicinity of δ=1.5 to 1.9

B: integrated value of methyl group of dimethylsiloxane part observed in the vicinity of δ=−0.02 to 0.3

C: integrated value of butyl group of p-tert-butylphenyl part observed in the vicinity of δ=1.2 to 1.4 a=A/6 b=B/6 c=C/9

T=a+b+c f=a/T×100 g=b/T×100 h=c/T×100

TW=f×254+g×74.1+h×149

PDMS (wt %)=g×74.1/TW×100

(2) Viscosity Average Molecular Weight

The viscosity average molecular weight (Mv) was calculated from the following Schnell's formula based on the limiting viscosity [η] obtained through measurement of the viscosity of the methylene chloride solution at 20° C. by using an Ubbelohde viscometer.

$$[\eta] = 1.23 \times 10^{-5} \times Mv^{0.83} \quad \text{[Numerical Formula 3]}$$

(3) Ratio [Number of Group Represented by Formula (vi)]/[Total Number of Group Represented by Formula (v) and Group Represented by Formula (vi)]

The ratio is a value calculated from the integrated value derived from Si of the —O—Si($R^5$)($R^6$)—$CH_2$— structure based on the formula (v) in the $^{29}$Si-NMR spectrum and the integrated value derived from Si of the —O—Si($R^5$)($R^6$)—O—Z-structure based on the formula (vi). Hereinafter the ratio is also referred to as "terminal impurity ratio"

(4) Ratio [Hydroxy Group in Formula (f) and Formula (g)]/[Total Number of Group Represented by Formula (v-ii) and Hydroxy Group in Formula (f) and Formula (g)]

To a solution obtained by dissolving 3 g of the PC-POS copolymer described in the following production example in 20 mL of dichloromethane in a 100-mL conical flask, 30 mL of 1 wt % sodium hydroxide/methanol solution was added, and the mixture was stirred at room temperature for 2 hours. After stirring, the mixture in the conical flask was subjected to natural filtration using pleated filter paper (150 mm, No. 5C, manufactured by Toyo Filter Paper Co., Ltd.). Steps of adding 10 mL of dichloromethane to the solid remaining on the filter paper and the conical flask for washing, and filtering the resulting washing liquid with the pleated filter paper were repeated twice.

To a separatory funnel, the whole quantity of liquid that had passed through the filter paper, 40 mL of dichloromethane and 50 mL of pure water were added. The mixture was shaken vigorously, and left standing for 1 minute, so that the aqueous phase and the organic phase were separated and the organic phase was isolated. Then, 20 mL of dichloromethane was added to the aqueous phase remaining in the separatory funnel, and the mixture was shaken vigorously and then allowed to stand for 1 minute to separate the aqueous phase and the organic phase, and the organic phase was isolated. The whole of the isolated organic phases and 35 ml of 1N sodium hydroxide aqueous solution were put in a separatory funnel, shaken vigorously, and left standing for 1 minute, so that the aqueous phase and the organic phase were separated and the organic phase was isolated. After repeating the step of isolating the organic phase twice, 1N sodium hydroxide aqueous solution was added to 1N hydrochloric acid aqueous solution, and the same step was repeated twice.

After adding 5.0 g of sodium sulfate to the isolated organic phase and stirring, sodium sulfate in the solution was removed by suction filtration. After suction filtration, the filtrate was concentrated to dryness by an evaporator (water bath temperature: 40° C.), and the resulting oily substance was subjected to $^{29}$Si-NMR measurement to calculate the ratio [hydroxy group in formula (f) and formula (g)]/[total number of group represented by formula (v-ii) and hydroxy group in formula (f) and formula (g)].

The ratio [hydroxy group in formula (f) and formula (g)]/[total number of group represented by formula (v-ii) and hydroxy group in formula (f) and formula (g)] also corresponds to ratio [total number of hydroxy groups in the formula (d) and formula (e)]/[total number of group represented by formula (v-i) and hydroxy group in the formula (d) and formula (e)].

<$^{29}$Si-NMR Measurement Conditions>

NMR apparatus: ECA-500 manufactured by JEOL RESONANCE Co., Ltd.

Probe: FG probe, compatible with 10 ϕ NMR sample tube

Observation nucleus: $^{29}$Si

Observation range: −65 to 35 ppm

Observation center: −15 ppm

Pulse repetition time: 18.3 seconds

Pulse width: 900

Number of scans: 5000

NMR sample tube: 10 ϕ

Sample amount: 750 mg

Relaxation reagent: 20 mM tris(acetylacetonate)chromium (III)

Solvent: deuterated chloroform

Measurement temperature: room temperature

A: integrated value of Si bonding to allylphenol observed in the vicinity of δ=7.5 to 9.0 ppm B: integrated value of silanol observed in the vicinity of δ=−9.6 to −9.9 ppm

[Hydroxy group in formula (f) and formula (g)]/[total number of group represented by formula (v-ii) and hydroxy group in formula (f) and formula (g)]=B/(A+B)

Preparation Example 1

<Carbinol-Modified Polyorganosiloxane: Production of PDMS-A>

Into a 150-L tubular reactor, each of 132 kg/h of organohydrogen polysiloxane represented by the following average formula (2-1) heated to 50° C., 14.5 kg/h of 2-allylphenol, and a platinum catalyst (toluene solution of 1,3-divinyl-1,1,3,3-tetramethyldisiloxane complex of chloroplatinic acid neutralized product) was supplied, such that 0.08 mass ppm in terms of platinum metal relative to the entire mixed solution in the system was achieved. The mixture was passed through the tubular reactor at 80° C. for 20 minutes for reaction, and then continuously taken out into a storage tank.

Then, using a thin film evaporator, excess 2-allylphenol was removed at 160° C. to synthesize a carbinol-modified polyorganosiloxane represented by the following average formula (II-I). The terminal impurity ratio of the resulting carbinol-modified polyorganosiloxane was 0.0015.

The formula (2-1) and the formula (II-I) are average formulas, and "36" means the average number of repetitions in a dimethylsiloxane unit.

[Formula 58]

(2-1)

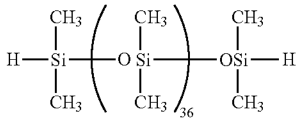

[Formula 59]

(II-I)

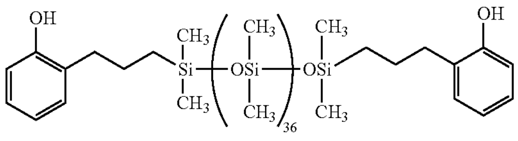

Preparation Example 2

<Carbinol-Modified Polyorganosiloxane: Production of PDMS-B>

Into a 150-L tubular reactor, each of 380 kg/h of organohydrogen polysiloxane represented by the following average formula (2-11) heated to 50° C., 19 kg/h of 2-allylphenol, and a platinum catalyst (toluene solution of 1,3-divinyl-1,1,3,3-tetramethyldisiloxane complex of chloroplatinic acid neutralized product) was supplied, such that 0.10 mass ppm in terms of platinum metal relative to the entire mixed solution in the system was achieved. The mixture was passed through the tubular reactor at 80° C. for 20 minutes for reaction, and then continuously taken out into a storage tank.

Then, using a thin film evaporator, excess 2-allylphenol was removed at 160° C. to synthesize a carbinol-modified polyorganosiloxane represented by the following average formula (II-I'). The terminal impurity ratio of the resulting carbinol-modified polyorganosiloxane was 0.0025.

The formula (2-11) and the formula (II-I') are average formulas, and "89" means the average number of repetitions in a dimethylsiloxane unit.

[Formula 60]

(2-11)

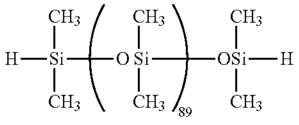

-continued

Formula 61]

(II-I')

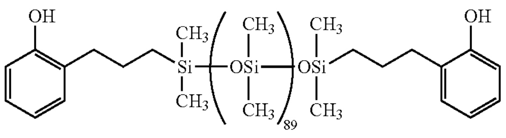

Preparation Example 3

<Carbinol-Modified Polyorganosiloxane: Production of PDMS-C>

The same operation as in the production of PDMS-B was performed except that the concentration of the platinum catalyst was 0.02 mass ppm in terms of platinum metal. The terminal impurity ratio of the resulting carbinol-modified polyorganosiloxane was 0.0010.

<KF-2201>

KF-2201 (trade name, manufactured by Shin-Etsu Chemical Co., Ltd., lot. 801015) was produced by performing a batch reaction for carbinol modification of the organosiloxane in Preparation Example 1.

<KF-1922>

KF-1922 (trade name, manufactured by Shin-Etsu Chemical Co., Ltd., lot. 704020) was produced by performing a batch reaction for carbinol modification of organosiloxane in Preparation Example 2.

<Production of Polycarbonate Oligomer>

To 5.6 mass % sodium hydroxide aqueous solution, sodium dithionite was added to a content of 2000 ppm relative to bisphenol A (BPA) to be dissolved later. BPA was dissolved therein to a BPA concentration of 13.5 mass %, so that an sodium hydroxide aqueous solution of BPA was prepared.

The sodium hydroxide aqueous solution of BPA at a flow rate of 40 L/hr, methylene chloride at 15 L/hr, and phosgene at 4.0 kg/hr were continuously passed through a tubular reactor having an inner diameter of 6 mm and a tube length of 30 m. The tubular reactor has a jacket portion, and cooling water was passed through the jacket to keep the temperature of the reaction solution at 40° C. or less. The reaction solution from the tubular reactor was continuously introduced into a tank reactor with a baffle having an internal volume of 40 L equipped with sweptback blades, into which sodium hydroxide aqueous solution of BPA at a flow rate of 2.8 L/hr, 25 mass % sodium hydroxide aqueous solution at 0.07 L/hr, water at 17 L/hr, and a 1 mass % triethylamine aqueous solution at 0.64 L/hr were further added for reaction. The reaction solution overflowing from the tank reactor was continuously extracted and allowed to stand to separate and remove the aqueous phase, so that a methylene chloride phase was collected.

The polycarbonate oligomer thus obtained had a concentration of 341 g/L and a chloroformate group concentration of 0.71 mol/L.

Production Examples 1 to 8 of Polycarbonate-Polyorganosiloxane Copolymer

The values (i) to (xiv) described below indicate the amounts used of respective components, and are as shown in Table 1.

A 50-L tank reactor equipped with a baffle plate, a paddle type stirring blade and a cooling jacket was charged with (i) kg of polycarbonate oligomer solution (PCO), (ii) kg of methylene chloride (MC), (iv) g of allylphenol-terminated polydimethylsiloxane having an average polydimethylsiloxane chain length of n=(iii) (hereinafter, polydimethylsiloxane may be referred to as PDMS) dissolved in (v) L of methylene chloride (MC), and (vi) mL of triethylamine (TEA), and while stirring the mixture, (vi) g of 8.0 mass % sodium hydroxide aqueous solution (NaOHaq) was added thereto so as to perform a reaction between the polycarbonate oligomer and the allylphenol terminal-modified PDMS for 20 minutes (preliminary polymerization step).

To the polymer solution, a methylene chloride solution of p-tert-butylphenol (PTBP) ((viii) g of PTBP dissolved in (ix) L of methylene chloride (MC)) and a sodium hydroxide aqueous solution of BPA ((xiii) g of BPA dissolved in an aqueous solution including (x) g of NaOH and (xi) g of sodium dithionite ($Na_2S_2O_4$) dissolved in (xii) L of water) were added, and a polymerization reaction was performed for 60 minutes (main polymerization step).

For dilution, (xiv) kg of methylene chloride (MC) was added thereto and after stirring for 10 minutes, an organic phase containing a PC-POS copolymer and an aqueous phase containing excess BPA and NaOH were separated. The organic phase was then isolated.

The resulting methylene chloride solution of the PC-POS copolymer was washed successively with 0.03 mol/L NaOH aqueous solution and 0.2 mol/L hydrochloric acid in amounts of 15 vol. % relative to the solution, and then the washing with pure water was repeated until the electrical conductivity in the aqueous phase reached 0.01 ρS/m or less.

After concentrating the methylene chloride solution of polycarbonate obtained by washing, 3 L of acetone (manufactured by Wako Pure Chemical Industries, Ltd., special grade) was added, and the solid material obtained after further concentration was pulverized. The resulting powder was dried under reduced pressure at 100° C. The flakes thus obtained were subject to measurements of PDMS concentration, viscosity average molecular weight, and ratio [Hydroxy group in formula (f) and formula (g)]/[total number of group represented by formula (v-ii) and hydroxy group in formula (f) and formula (g)]. The measurement results are shown in Table 1 and Table 2.

TABLE 1

| | Production Example | | | | | | | |
|---|---|---|---|---|---|---|---|---|
| | 1 | 2 | 3 | 4 | 5 | 6 | 7 | 8 |
| (i) PCO (kg) | 19.7 | 19.7 | 19.7 | 19.7 | 19.7 | 19.7 | 19.7 | 19.7 |
| (ii) MC (kg) | 11.4 | 11.4 | 11.4 | 11.4 | 11.4 | 11.4 | 11.4 | 11.4 |
| PDMS used | PDM S · A | PDM S · A | PDM S · A | PDM S · A | KF-2201 lot801015 | PDM S · B | PDM S · C | KF-1922 lot704020 |
| (iii) PDMS chain length (n) | 36 | 36 | 36 | 36 | 36 | 89 | 89 | 89 |
| Amount of platinum in PDMS | 0.1 | 0.1 | 0.1 | <0.1 | 1.0 | <0.1 | <0.1 | 0.5 |
| (iv)Amount of PDMS charged | 410 | 410 | 410 | 410 | 410 | 360 | 410 | 360 |
| (v) MC (L) | 2.0 | 2.0 | 2.0 | 2.0 | 2.0 | 2.0 | 2.0 | 2.0 |
| (vi) TEA (mL) | 11.2 | 11.2 | 11.2 | 11.2 | 11.2 | 8.4 | 8.4 | 8.4 |
| (vii) 8 wt % NaOHaq (g) | 2170 | 2170 | 2170 | 2170 | 2170 | 1085 | 1085 | 1085 |
| (viii) PTBP (g) | 147 | 147 | 147 | 147 | 147 | 147 | 147 | 147 |
| (ix) MC (L) | 0.5 | 0.5 | 0.5 | 0.5 | 0.5 | 0.5 | 0.5 | 0.5 |
| (x) NaOH (g) | 562 | 562 | 562 | 562 | 562 | 562 | 562 | 562 |
| (xi) $Na_2S_2O_4$ (g) | 1.7 | 1.7 | 1.7 | 1.7 | 1.7 | 2.1 | 2.1 | 2.1 |
| (xii) Water (L) | 8.2 | 8.2 | 8.2 | 8.2 | 8.2 | 8.2 | 8.2 | 8.2 |
| (xiii) BPA (g) | 826 | 826 | 826 | 826 | 826 | 1044 | 1044 | 1044 |
| (xiv) MC (kg) | 17.3 | 17.3 | 17.3 | 17.3 | 17.3 | 17.3 | 17.3 | 17.3 |
| Mv | 17100 | 16900 | 17000 | 17200 | 16900 | 19200 | 19100 | 19200 |
| PDMS concentration (wt %) | 6.5 | 6.4 | 6.4 | 6.4 | 6.3 | 5.6 | 5.8 | 5.6 |
| SiPC copolymer | A1 | A2 | A3 | A4 | A5 | A6 | A7 | A8 |

TABLE 2

| | Production Example | | | | | | | |
|---|---|---|---|---|---|---|---|---|
| | 1 | 2 | 3 | 4 | 5 | 6 | 7 | 8 |
| [OH group in formula (f) and formula (g)]/[total number of group represented by formula (v-ii) and OH group in formula (f) and formula (g)] | <0.006 | <0.006 | <0.006 | <0.006 | 0.015 | <0.006 | <0.006 | 0.018 |
| SiPC copolymer | A1 | A2 | A3 | A4 | A5 | A6 | A7 | A8 |

<Other Component>

Antioxidant: IRGAFOS 168 [tris(2,4-di-tert-butylphenyl) phosphite, manufactured by BASF Japan Ltd.]

Examples 1 to 6, Comparative Examples 1 to 2, and Reference Examples 1 to 8

The PC-POS copolymers A1 to A5 obtained in the production examples were subjected retention heat stability evaluation (1) described later. The results are shown in Table 3.

To each of 100 pts. mass of the PC-POS copolymers A6 to A8 obtained in the production examples, 0.10 pts. mass of Irgafos168 was added, and the mixture was supplied to a vent type twin-screw extruder (TEM35B manufactured by Toshiba Machine Co., Ltd.), melt-kneaded at a screw rotation speed of 150 rpm, a discharge rate of 20 kg/hr, and a resin temperature of 295 to 310° C. to prepare a pellet sample for the retention heat stability evaluation (2) described later. The results are shown in Table 4.

The PC-POS copolymer and other components were mixed at a blending ratio shown in Table 5 and supplied to a vent type twin-screw extruder (TEM35B manufactured by Toshiba Machine Co., Ltd.) at a screw rotation speed of 150 rpm, a discharge rate of 20 kg/hr and a resin temperature of 295 to 310° C. to prepare a pellet sample for evaluation. The physical property test described later was performed. The results are shown in Table 5.

TABLE 3

| | | Example | | | | Comparative Example 1 |
|---|---|---|---|---|---|---|
| | | 1 | 2 | 3 | 4 | |
| (A) PC-POS | | A1 | A2 | A3 | A4 | A5 |
| Molecular weight Mv of polycarbonate-based resin (S) | | 17100 | 16900 | 17000 | 17200 | 16900 |
| PDMS block portion content in polycarbonate-based resin (S) | mass % | 6.5 | 6.4 | 6.4 | 6.4 | 6.3 |
| ΔHaze | | 0.1 | 0.1 | 0.1 | 0.1 | 0.4 |

TABLE 4

| | | Example | | Comparative Example |
|---|---|---|---|---|
| | | 5 | 6 | 2 |
| (A) PC-POS | | A6 | A7 | A8 |
| Molecular weight Mv of polycarbonate-based resin (S) | | 19200 | 19100 | 19200 |
| PDMS block portion content in polycarbonate-based resin (S) | mass % | 5.6 | 5.8 | 5.6 |
| ΔHaze | | 0.2 | 0.0 | 1.7 |

TABLE 5

| | | | | Reference Example | | | | | | | |
|---|---|---|---|---|---|---|---|---|---|---|---|
| | | | | 1 | 2 | 3 | 4 | 5 | 6 | 7 | 8 |
| PC-based resin (S) | (A) PC-POS | (A1) | pts. mass | 100 | | | | | | | |
| | | (A2) | pts. mass | | 100 | | | | | | |
| | | (A3) | pts. mass | | | 100 | | | | | |
| | | (A4) | pts. mass | | | | 100 | | | | |
| | | (A5) | pts. mass | | | | | 100 | | | |
| | | (A6) | pts. mass | | | | | | 100 | | |
| | | (A7) | pts. mass | | | | | | | 100 | |
| | | (A8) | pts. mass | | | | | | | | 100 |
| | Other | Irgafos 168 | pts. mass | | | | | | 0.10 | 0.10 | 0.10 |
| Molecular weight Mv of polycarbonate-based resin (S) | | | | 17100 | 16900 | 17000 | 17200 | 16900 | 19200 | 19100 | 19200 |
| PDMS block portion content in polycarbonate-based resin (S) | | | mass % | 6.5 | 6.4 | 6.4 | 6.4 | 6.3 | 5.6 | 5.8 | 5.6 |
| Physical property | | MVR (300° C., 1.2 kg) | ml/10 min | 12 | 12 | 13 | 12 | 11.7 | 14 | 15 | 14 |
| | | Q value (280° C., 160 kg) | ×0.01 ml/s | 14.1 | 14.2 | 14.3 | 13.9 | 14.0 | 12.0 | 13.0 | 12.0 |
| | | HDT | ° C. | 122 | 122 | 122 | 122 | 122 | 125 | 125 | 125 |
| | | Izod impact strength (23° C.) | $kJ/m^2$ | 73 | 72 | 73 | 75 | 73 | 80 | 80 | 80 |

TABLE 5-continued

| | | Reference Example | | | | | | | |
|---|---|---|---|---|---|---|---|---|---|
| | | 1 | 2 | 3 | 4 | 5 | 6 | 7 | 8 |
| Izod impact strength (0° C.) | kJ/m$^2$ | 71 | 71 | 70 | 71 | 70 | 74 | 73 | 74 |
| Izod impact strength (−10° C.) | kJ/m$^2$ | 74 | 72 | 73 | 74 | 73 | 69 | 71 | 70 |
| Izod impact strength (−20° C.) | kJ/m$^2$ | 67 | 66 | 67 | 68 | 67 | 71 | 70 | 70 |
| Izod impact strength (−30° C.) | kJ/m$^2$ | 64 | 64 | 63 | 65 | 64 | 69 | 69 | 69 |

[Evaluation Test]

<Fluidity Evaluation> (MVR)

The pellet was subject to measurement of the amount of molten resin flowing out from a die having a diameter of 2.095±0.005 mm and a length of 8.000±0.025 mm under a load of 1.2 kg at 300° C. (ml/10 minutes) according to JIS K 7210-1: 2014.

<Q Value (Flow Value) [Unit: $10^{-2}$ mL/s]>

The pellet was subject to measurement of the amount of molten resin flowing out from a nozzle having a diameter of 1.00 mm and a length of 10.00 mm ($10^{-2}$ mL/s), in accordance with JIS K 7210-1: 2014: Annex JA, using an elevated flow tester at 280° C. under a pressure of 160 kgf. The Q value represents the amount of outflow per unit time, and the higher the value, the better the fluidity.

<Impact Resistance>

The resulting pellets dried at 100° C. for 8 hours were subject to injection molding with an injection molding machine (NEX110 manufactured by Nissei Plastic Industrial Co., Ltd., screw diameter: 36 mm) at a cylinder temperature of 280° C. and a mold temperature of 80° C. to prepare an IZOD test piece (length: 63.5 mm, width: 12.7 mm, thickness: 3.2 mm). The test piece was notched by a post-processing (r=0.25 mm±0.05 mm). The notched sample piece was subject to measurement of notched Izod impact strength in accordance with ASTM standard D-256, at −30° C., −20° C., −10° C., 0° C., and 23° C.

<Deflection Temperature Under Load: HDT (Unit: ° C.)>

The resulting pellets dried at 100° C. for 8 hours were subject to injection molding with an injection molding machine (NEX110 manufactured by Nissei Plastic Industrial Co., Ltd., screw diameter: 36 mm) at a cylinder temperature of 280° C. and a mold temperature of 80° C. to prepare a test piece (length: 127 mm, width: 12.7 mm, thickness: 3.2 mm). The test piece was notched by a post-processing (r=0.25 mm±0.05 mm). To the test piece, a load of 1.83 MPa was applied at a heating rate of 120° C./h and a distance between fulcrums of 100 mm in accordance with ASTM standard D-648, and the temperature at which the edgewise deflection of the test piece reaching 0.26 mm was recorded.

<Retention Heat Stability Evaluation (1)>

The resulting powder was subject to a retention heat stability test by injection molding as follows, and each haze value of the resulting molded articles was measured, and a difference between the haze value (haze A) after retention for 3 minutes and the haze value (haze B) after retention for 20 minutes was obtained as Δhaze. The haze value was measured three times based on ISO 14782: 1999, and the average thereof was calculated. The results are shown in Table 3.

The haze value of the product obtained from the powder in Example 1 by injection molding was 0.4.

<Injection Molding>

Injection molding machine: MD50 (trade name) manufactured by Niigata Machine Techno Co., Ltd.

Shape of molded article: 90 mm by 50 mm, 3-stage plate (3-mm-thick part: 45 mm, 2-mm-thick part: 22.5 mm, 1-mm-thick part: 22.5 mm)

Molding machine cylinder temperature: 300° C.

Retention time in cylinder: 3 minutes or 20 minutes

Mold temperature: 80° C.

<Retention Heat Stability Evaluation (2)>

The resulting powder was subject to a retention heat stability test by injection molding as follows, and each haze value of the resulting molded articles was measured, and a difference between the haze value (haze A) after retention for 3 minutes and the haze value (haze B) after retention for 20 minutes was obtained as Δhaze. The haze value was measured three times based on ISO 14782: 1999, and the average thereof was calculated. The results are shown in Table 4.

<Injection Molding>

Injection molding machine: EC40 (trade name) manufactured by Toshiba Machine Co., Ltd.

Shape of molded article: 80 mm by 40 mm by 3.2 mm

Molding machine cylinder temperature: 340° C.

Retention time in cylinder: 3 minutes or 20 minutes

Mold temperature: 80° C.

The invention claimed is:

1. A polycarbonate-polyorganosiloxane copolymer composition comprising a polycarbonate block (A-1) formed of a repeating unit represented by the following general formula (I) and a polyorganosiloxane block (A-2) containing a repeating unit represented by the following general formula (II), wherein a difference between a haze value (haze A) after retention for 3 minutes and a haze value (haze B) after retention for 20 minutes, of the polycarbonate-polyorganosiloxane copolymer at 300° C. or 340° C., Δhaze, is less than 0.4:

(I)

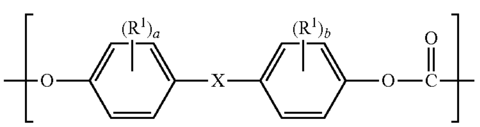

-continued (II)

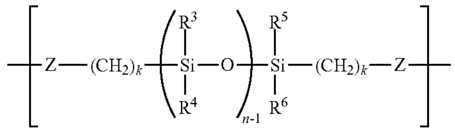

wherein $R^1$ and $R^2$ each independently represent a halogen atom, an alkyl group having 1 to 6 carbon atoms, or an alkoxy group having 1 to 6 carbon atoms; X represents a single bond, an alkylene group having 1 to 8 carbon atoms, an alkylidene group having 2 to 8 carbon atoms, a cycloalkylene group having 5 to 15 carbon atoms, an arylene group having 6 to 12 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —$SO_2$—, —O— or —CO—; a and b each independently represent an integer of 0 to 4; $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms; n represents the average chain length of polyorganosiloxane, and n−1 represents the number of repetitions of the polyorganosiloxane unit and is an integer of 1 or more; Z represents a divalent hydrocarbon group, and at least one of the hydrogen atoms contained in the divalent hydrocarbon group is optionally replaced by a halogen atom or a monovalent hydrocarbon group having 1 to 20 carbon atoms; at least one of the carbon atoms in the divalent hydrocarbon group or the monovalent hydrocarbon group is optionally replaced by an oxygen atom, a nitrogen atom or a sulfur atom; and k represents an integer of 2 or 3.

2. The polycarbonate-polyorganosiloxane copolymer according to claim 1, wherein the polycarbonate-polyorganosiloxane copolymer has a platinum content of 0.05 mass ppb or more and less than 0.5 mass ppm.

3. The polycarbonate-polyorganosiloxane copolymer according to claim 1, wherein Z in the formula (II) is represented by the following general formula (II-a):

(II-a)

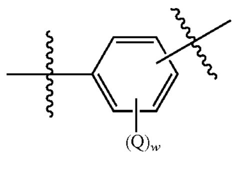

wherein Q represents a halogen atom or a monovalent hydrocarbon group having 1 to 20 carbon atoms, and at least one of the hydrogen atoms contained in the monovalent hydrocarbon group is optionally replaced by a halogen atom; at least one of the carbon atoms of the monovalent hydrocarbon group is optionally replaced by an oxygen atom, a nitrogen atom or a sulfur atom; w is an integer of 0 to 4, and a wavy line represents a binding site.

4. The polycarbonate-polyorganosiloxane copolymer according to claim 1, wherein the polyorganosiloxane block (A-2) has an average chain length n of 10 or more and 300 or less.

5. The polycarbonate-polyorganosiloxane copolymer according to claim 1, comprising a polycarbonate-polyorganosiloxane copolymer represented by the following general formula (f) and a compound represented by the following general formula (g), wherein a ratio [total number of hydroxy group in formula (f) and formula (g)]/[total number of group represented by formula (v-ii) and hydroxy group in formula (f) and formula (g)] is less than 0.01:

$$-(CH_2)_k-Z- \quad \text{(v-ii)}$$

wherein Z is as described above; and k is 2 or 3;

(f)

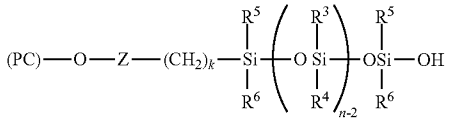

wherein $R^3$ to $R^6$, n and k are as described above; and (PC) represents a bond to a polycarbonate block;

(g)

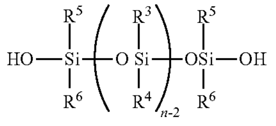

wherein $R^3$ to $R^6$ and n are as described above.

6. A polycarbonate-polyorganosiloxane copolymer produced by copolymerizing a carbinol-modified polyorganosiloxane with a divalent phenol and a carbonate precursor, the carbinol-modified polyorganosiloxane being obtained through a hydrosilylation reaction of an organohydrogensiloxane represented by the following general formula (2), a compound represented by the following general formula (3), and a platinum catalyst that are continuously supplied to a reactor and passed through the reactor; or produced by copolymerizing the carbinol-modified polyorganosiloxane with an oligomer having a repeating unit represented by the following general formula (I):

(2)

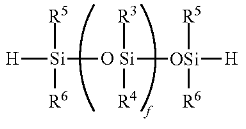

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms; a plurality of $R^3$ to $R^6$ may be identical to or different from each other; and f is an integer of 0 to 500;

$$R^{22}-Z-OH \quad (3)$$

wherein $R^{22}$ represents a vinyl group or an allyl group, Z represents a divalent hydrocarbon group, and at least one of the hydrogen atoms contained in the divalent hydrocarbon group is optionally replaced by a halogen atom or a monovalent hydrocarbon group having 1 to 20 carbon atoms; and at least one of the carbon atoms in each of the divalent hydrocarbon group and the monovalent hydrocarbon group is optionally replaced by an oxygen atom, a nitrogen atom or a sulfur atom;

(I)

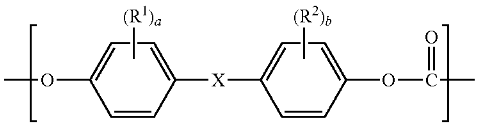

wherein $R^1$ and $R^2$ each independently represent a halogen atom, an alkyl group having 1 to 6 carbon atoms, or an alkoxy group having 1 to 6 carbon atoms; X represents a single bond, an alkylene group having 1 to 8 carbon atoms, an alkylidene group having 2 to 8 carbon atoms, a cycloalkylene group having 5 to 15 carbon atoms, an arylene group having 6 to 12 carbon atoms, and a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, $—SO_2—$, —O— or —CO—; and a and b each independently represent an integer of 0 to 4, wherein the platinum catalyst is used in an amount of 0.005 mass ppm or more and less than 1.0 mass ppm in terms of platinum metal relative to the total amount of the organohydrogensiloxane represented by the general formula (2), the compound represented by the general formula (3), and the platinum catalyst, and wherein, as the carbinol-modified polyorganosiloxane, a carbinol-modified polyorganosiloxane represented by the following general formula (222), with $R^a$ in formula (222) having a ratio [number of group represented by formula (vi)]/[total number of group represented by formula (v) and group represented by formula (vi)] of less than 0.01, is used:

(222)

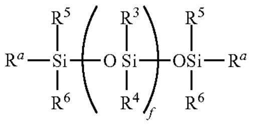

wherein $R^3$ to $R^6$ and f are as described above, and each $R^a$ is independently a group represented by the following general formula (v) or (vi):

(v)

$$—(CH_2)_k—Z—OH$$

wherein Z is as described above, and k is 2 or 3;

(vi)

$$—O—Z—R^{33}$$

wherein Z is as described above; $R^{33}$ represents a vinyl group, an allyl group, or a terminal group having $—(CH_2)_k—SiR^5R^6O—$ derived from a reaction between Si—H of the following general formula (2) and a vinyl group or an allyl group; and k is 2 or 3:

(2)

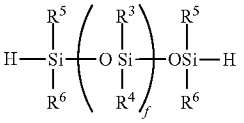

wherein $R^3$ to $R^6$ and f are as described above.

7. The polycarbonate-polyorganosiloxane copolymer according to claim 6, wherein the platinum catalyst is used in an amount of 0.005 mass ppm or more and 0.2 mass ppm or less in terms of platinum metal relative to the total amount of the organohydrogensiloxane represented by the general formula (2), the compound represented by the general formula (3), and the platinum catalyst.

8. The polycarbonate-polyorganosiloxane copolymer according to claim 6, wherein the compound represented by the general formula (3) is a compound represented by the following general formula (33):

(33)

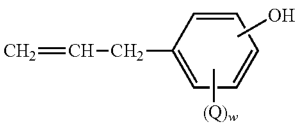

wherein Q represents a halogen atom or a monovalent hydrocarbon group having 1 to 20 carbon atoms, and at least one of the hydrogen atoms contained in the monovalent hydrocarbon group is optionally replaced by a halogen atom; at least one of the carbon atoms of the monovalent hydrocarbon group is optionally replaced by an oxygen atom, a nitrogen atom or a sulfur atom; and w is an integer of 0 to 4.

9. The polycarbonate-polyorganosiloxane copolymer according to claim 6, comprising a polycarbonate-polyorganosiloxane copolymer having a polyorganosiloxane unit represented by the following general formula (222-i), a polycarbonate-polyorganosiloxane copolymer represented by the following general formula (b), and a compound represented by the following general formula (c), wherein a ratio [number of group represented by $\{—O—Z—R^{33}\}$ in formula (b) and formula (c)]/[total number of group represented by formula (v-i) and group represented by $\{—O—Z—R^{33}\}$ in formula (b) and formula (c)] is less than 0.01:

(222-i)

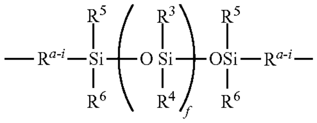

wherein $R^3$ to $R^6$ and f are as described above, and each $R^a$ is independently a group represented by the following general formula (v-i):

(v-i)

$$-(CH_2)_k-Z-O-$$

wherein Z is as described above; an oxygen atom in formula (v-i) is bonded to a polycarbonate unit; and k is 2 or 3, (b)

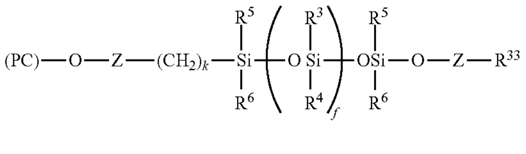

wherein $R^3$ to $R^6$, Z, $R^{33}$, f, and k are as described above, and (PC) represents a bond to a polycarbonate block, (c)

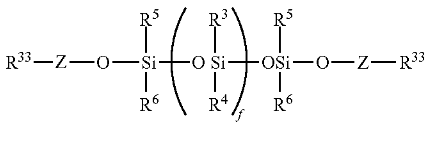

wherein $R^3$ to $R^6$, Z, $R^{33}$, and f are as described above.

10. The polycarbonate-polyorganosiloxane copolymer according to claim 6, comprising:

a polycarbonate-polyorganosiloxane copolymer having a polyorganosiloxane unit represented by the following general formula (223-i);

a polycarbonate-polyorganosiloxane copolymer represented by the following general formula (d); and a compound represented by the following general formula (e), wherein the compound represented by general formula (e) remains as impurity without reacting with the carbonate precursor, the dihydric phenol, or the polycarbonate oligomer, wherein a ratio [total number of hydroxy group in formula (d) and formula (e)]/[total number of group represented by formula (v-i) and hydroxy group in formula (d) and formula (e)] is less than 0.01:

(223-i)

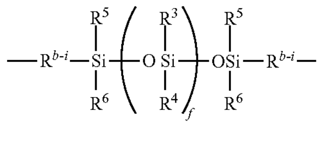

wherein $R^3$ to $R^6$ and f are as described above, and each $R^{b-i}$ is independently a group represented by the following general formula (v-i):

(v-i)

$$-(CH_2)_k-Z-O-$$

wherein Z is as described above; an oxygen atom in the formula (v-i) is bonded to a polycarbonate unit; and k is 2 or 3, (d)

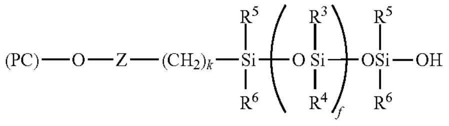

wherein $R^3$ to $R^6$, f and k are as described above, and (PC) represents a bond to a polycarbonate block, (e)

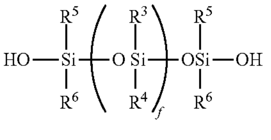

wherein $R^3$ to $R^6$ and f are as described above.

11. A polycarbonate-based resin composition comprising the polycarbonate-polyorganosiloxane copolymer according to claim 1.

12. A molded article comprising the polycarbonate-based resin composition according to claim 11.

13. A polycarbonate-based resin composition comprising the polycarbonate-polyorganosiloxane copolymer according to claim 6.

14. A molded article comprising the polycarbonate-based resin composition according to claim 6.

15. A polycarbonate-polyorganosiloxane copolymer produced by copolymerizing a carbinol-modified polyorganosiloxane with a divalent phenol and a carbonate precursor, the carbinol-modified polyorganosiloxane being obtained through a hydrosilylation reaction of an organohydrogensiloxane represented by the following general formula (2), a compound represented by the following general formula (3), and a platinum catalyst that are continuously supplied to a reactor and passed through the reactor; or produced by copolymerizing the carbinol-modified polyorganosiloxane with an oligomer having a repeating unit represented by the following general formula (I):

(2)

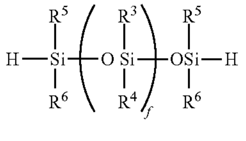

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms; a plurality of $R^3$ to $R^6$ may be identical to or different from each other; and f is an integer of 0 to 500;

(3)

$$R^{22}-Z-OH$$

wherein $R^{22}$ represents a vinyl group or an allyl group, Z represents a divalent hydrocarbon group, and at least one of the hydrogen atoms contained in the divalent hydrocarbon group is optionally replaced by a halogen atom or a monovalent hydrocarbon group having 1 to 20 carbon atoms; and at least one of the carbon atoms in each of the divalent hydrocarbon group and the monovalent hydrocarbon group is optionally replaced by an oxygen atom, a nitrogen atom or a sulfur atom;

(I)

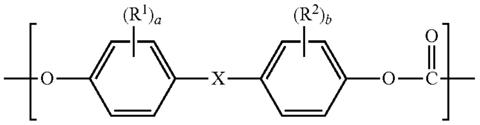

wherein $R^1$ and $R^2$ each independently represent a halogen atom, an alkyl group having 1 to 6 carbon atoms, or an alkoxy group having 1 to 6 carbon atoms; X represents a single bond, an alkylene group having 1 to 8 carbon atoms, an alkylidene group having 2 to 8 carbon atoms, a cycloalkylene group having 5 to 15 carbon atoms, an arylene group having 6 to 12 carbon atoms, and a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, $—SO_2—$, —O— or —CO—; and a and b each independently represent an integer of 0 to 4, wherein the platinum catalyst is used in an amount of 0.005 mass ppm or more and less than 1.0 mass ppm in terms of platinum metal relative to the total amount of the organohydrogensiloxane represented by the general formula (2), the compound represented by the general formula (3), and the platinum catalyst, and wherein the polycarbonate-polyorganosiloxane copolymer comprises:

a polycarbonate-polyorganosiloxane copolymer having a polyorganosiloxane unit represented by the following general formula (222-i), a polycarbonate-polyorganosiloxane copolymer represented by the following general formula (b), and a compound represented by the following general formula (c), wherein a ratio [number of group represented by $\{—O—Z—R^{33}\}$ in formula (b) and formula (c)]/[total number of group represented by formula (v-i) and group represented by $\{—O—Z—R^{33}\}$ in formula (b) and formula (c)] is less than 0.01:

(222-i)

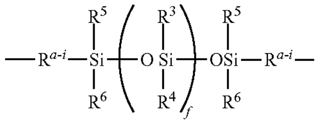

wherein $R^3$ to $R^6$ and f are as described above, and each $R^a$ is independently a group represented by the following general formula (v-i):

(v-i)

$$—(CH_2)_k—Z—O—$$

wherein Z is as described above; an oxygen atom in formula (v-i) is bonded to a polycarbonate unit; and k is 2 or 3, (b)

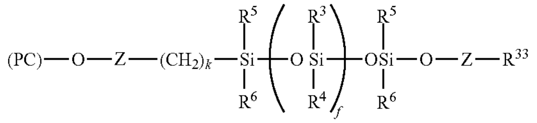

wherein $R^3$ to $R^6$, Z, $R^{33}$, f, and k are as described above, and (PC) represents a bond to a polycarbonate block, (c)

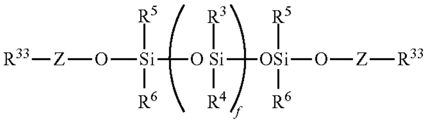

wherein $R^3$ to $R^6$, Z, $R^{33}$, and f are as described above.

16. A polycarbonate-polyorganosiloxane copolymer produced by copolymerizing a carbinol-modified polyorganosiloxane with a divalent phenol and a carbonate precursor, the carbinol-modified polyorganosiloxane being obtained through a hydrosilylation reaction of an organohydrogensiloxane represented by the following general formula (2), a compound represented by the following general formula (3), and a platinum catalyst that are continuously supplied to a reactor and passed through the reactor; or produced by copolymerizing the carbinol-modified polyorganosiloxane with an oligomer having a repeating unit represented by the following general formula (I):

(2)

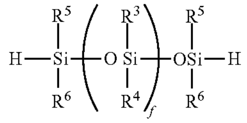

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms; a plurality of $R^3$ to $R^6$ may be identical to or different from each other; and f is an integer of 0 to 500;

(3)

$$R^{22}—Z—OH$$

wherein $R^{22}$ represents a vinyl group or an allyl group, Z represents a divalent hydrocarbon group, and at least one of the hydrogen atoms contained in the divalent hydrocarbon group is optionally replaced by a halogen atom or a monovalent hydrocarbon group having 1 to 20 carbon atoms; and at least one of the carbon atoms in each of the divalent hydrocarbon group and the monovalent hydrocarbon group is optionally replaced by an oxygen atom, a nitrogen atom or a sulfur atom;

(I)

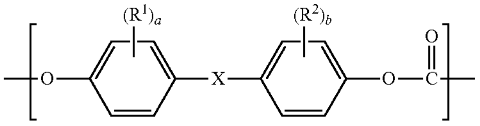

wherein $R^1$ and $R^2$ each independently represent a halogen atom, an alkyl group having 1 to 6 carbon atoms, or an alkoxy group having 1 to 6 carbon atoms; X represents a single bond, an alkylene group having 1 to 8 carbon atoms, an alkylidene group having 2 to 8 carbon atoms, a cycloalkylene group having 5 to 15 carbon atoms, an arylene group having 6 to 12 carbon atoms, and a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, $—SO_2—$, —O— or —CO—; and a and b each independently represent an integer of 0 to 4, wherein the platinum catalyst is used in an amount of 0.005 mass ppm or more and less than 1.0 mass ppm in terms of platinum metal relative to the total amount of the organohydrogensiloxane represented by the general formula (2), the compound represented by the general formula (3), and the platinum catalyst, and wherein the polycarbonate-polyorganosiloxane copolymer comprises:

a polycarbonate-polyorganosiloxane copolymer having a polyorganosiloxane unit represented by the following general formula (223-i);

a polycarbonate-polyorganosiloxane copolymer represented by the following general formula (d); and a compound represented by the following general formula (e), wherein the compound represented by general formula (e) remains as impurity without reacting with the carbonate precursor, the dihydric phenol, or the polycarbonate oligomer, wherein a ratio [total number of hydroxy group in formula (d) and formula (e)]/[total number of group represented by formula (v-i) and hydroxy group in formula (d) and formula (e)] is less than 0.01:

(223-i)

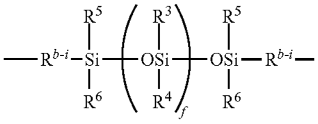

wherein $R^3$ to $R^6$ and f are as described above, and each $R^{b-i}$ is independently a group represented by the following general formula (v-i):

$$—(CH_2)_k—Z—O— \quad \text{(v-i)}$$

wherein Z is as described above; an oxygen atom in the formula (v-i) is bonded to a polycarbonate unit; and k is 2 or 3, (d)

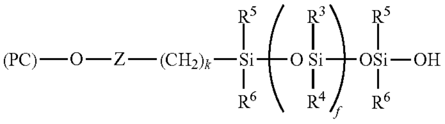

wherein $R^3$ to $R^6$, f and k are as described above, and (PC) represents a bond to a polycarbonate block, (e)

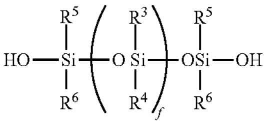

wherein $R^3$ to $R^6$ and f are as described above.

* * * * *